US012682341B2

(12) United States Patent
Szigeti et al.

(10) Patent No.: US 12,682,341 B2
(45) Date of Patent: *Jul. 14, 2026

(54) DETECTING ANOMALOUS TRANSACTIONS WITHIN AN APPLICATION BY PRIVILEGED USER ACCOUNTS

(71) Applicant: Cisco Technology, Inc., San Jose, CA (US)

(72) Inventors: Thomas Szigeti, Vancouver (CA); David John Zacks, Vancouver (CA); Walter Theodore Hulick, Jr., Pearland, TX (US); Nagendra Kumar Nainar, Morrisville, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/723,885

(22) Filed: Apr. 19, 2022

(65) Prior Publication Data

US 2023/0334478 A1    Oct. 19, 2023

(51) Int. Cl.
| | |
|---|---|
| *G06Q 20/38* | (2012.01) |
| *G06F 11/30* | (2006.01) |
| *G06F 11/34* | (2006.01) |
| *G06F 16/28* | (2019.01) |
| *G06Q 20/40* | (2012.01) |
| *G06Q 30/06* | (2023.01) |
| *H04L 12/24* | (2006.01) |
| *H04L 12/26* | (2006.01) |
| *H04L 12/751* | (2013.01) |
| *H04L 41/12* | (2022.01) |

(52) U.S. Cl.
CPC ......... *G06Q 20/382* (2013.01); *G06Q 20/405* (2013.01); *G06Q 30/06* (2013.01)

(58) Field of Classification Search
CPC .... G06Q 20/382; G06Q 20/405; G06Q 30/06; G06F 21/55
USPC ........................................................ 726/26
See application file for complete search history.

(56) References Cited

U.S. PATENT DOCUMENTS

| | | | |
|---|---|---|---|
| 10,791,170 B2 | 9/2020 | Badawy et al. | |
| 10,951,606 B1 * | 3/2021 | Shahidzadeh | ......... H04L 63/107 |

(Continued)

OTHER PUBLICATIONS

"Symantec Data Loss Prevention—Drive Total Protection of Your Sensitive Data", online: https://docs.broadcom.com/doc/data-loss-prevention-family-en, Jan. 7, 2022, accessed Mar. 31, 2022, 5 pages, Broadcom, Inc.

(Continued)

*Primary Examiner* — Berhanu Shitayewoldetadik
(74) *Attorney, Agent, or Firm* — Lee & Hayes, P.C.

(57)    ABSTRACT

In one embodiment, a device obtains data regarding a transaction attempted by a user account within an online application that is captured by instrumentation code that is inserted into the online application at runtime, wherein the user account has sufficient privileges within the online application to perform the transaction. The device makes an inference about the data regarding the transaction using a behavioral model. The device determines, based on the inference, a mitigation action for performance within the online application according to an enforcement policy. The device enforces the mitigation action within the online application.

20 Claims, 15 Drawing Sheets

(56) References Cited

U.S. PATENT DOCUMENTS

| | | | | |
|---|---|---|---|---|
| 11,005,839 | B1* | 5/2021 | Shahidzadeh | H04W 12/06 |
| 11,089,064 | B1 | 8/2021 | Sarukkai et al. | |
| 11,238,366 | B2 | 2/2022 | Bolding et al. | |
| 11,265,329 | B2 | 3/2022 | Koottayi et al. | |
| 11,947,939 | B1* | 4/2024 | Longmore | H04L 67/53 |
| 2004/0064586 | A1* | 4/2004 | Weigand | H04L 67/306 |
| | | | | 709/206 |
| 2005/0039171 | A1* | 2/2005 | Avakian | G06F 11/3495 |
| | | | | 717/130 |
| 2007/0038774 | A1* | 2/2007 | Weigand | H04L 67/63 |
| | | | | 709/238 |
| 2009/0063850 | A1* | 3/2009 | Joram | H04L 9/3271 |
| | | | | 713/155 |
| 2009/0164270 | A1* | 6/2009 | Seidman | G06Q 10/06 |
| | | | | 705/7.38 |
| 2009/0287356 | A1* | 11/2009 | Dunne | G01N 15/1427 |
| | | | | 700/282 |
| 2010/0058345 | A1* | 3/2010 | Seidman | G06F 11/3466 |
| | | | | 718/101 |
| 2011/0106698 | A1* | 5/2011 | Isaacson | G06Q 30/02 |
| | | | | 705/41 |
| 2011/0231769 | A1* | 9/2011 | Tovar | H04L 63/10 |
| | | | | 715/735 |
| 2012/0150599 | A1* | 6/2012 | Isaacson | G06Q 20/384 |
| | | | | 705/14.17 |
| 2012/0297371 | A1* | 11/2012 | Greifeneder | G06F 11/3495 |
| | | | | 717/128 |
| 2012/0304172 | A1* | 11/2012 | Greifeneder | G06F 11/3419 |
| | | | | 718/1 |
| 2012/0309346 | A1* | 12/2012 | Yang | H04W 4/24 |
| | | | | 455/406 |
| 2013/0013507 | A1* | 1/2013 | Browning | G06Q 20/405 |
| | | | | 705/44 |
| 2013/0132551 | A1* | 5/2013 | Bose | G06F 11/0709 |
| | | | | 709/223 |
| 2013/0173476 | A1* | 7/2013 | Sayers | G06Q 20/10 |
| | | | | 235/379 |
| 2014/0229383 | A1* | 8/2014 | Wolfe | G06Q 20/354 |
| | | | | 705/44 |
| 2014/0250001 | A1* | 9/2014 | Isaacson | G06Q 20/381 |
| | | | | 705/39 |
| 2015/0032884 | A1* | 1/2015 | Greifeneder | G06F 11/3419 |
| | | | | 709/224 |
| 2016/0105350 | A1* | 4/2016 | Greifeneder | H04L 67/1001 |
| | | | | 709/224 |
| 2017/0220805 | A1* | 8/2017 | Ng | G06F 21/577 |
| 2019/0132350 | A1* | 5/2019 | Smith | G06F 21/60 |
| 2019/0347578 | A1 | 11/2019 | Bolding et al. | |
| 2019/0370115 | A1* | 12/2019 | Garvey | G06F 11/3452 |
| 2020/0211075 | A1* | 7/2020 | Kumar | G06F 3/0346 |
| 2021/0024796 | A1 | 1/2021 | Hulick, Jr. | |
| 2021/0135857 | A1* | 5/2021 | Parvataneni | H04L 67/104 |
| 2021/0200393 | A1* | 7/2021 | Wohlstadter | G06F 3/04883 |
| 2021/0226998 | A1 | 7/2021 | Narayanaswamy et al. | |
| 2021/0334386 | A1* | 10/2021 | AlGhamdi | G06F 9/542 |
| 2021/0367955 | A1* | 11/2021 | Koral | H04L 63/1458 |
| 2023/0334478 | A1* | 10/2023 | Szigeti | G06Q 20/405 |

OTHER PUBLICATIONS

"Proofpoint Endpoint DLP and Proofpoint ITM", online: https://www.proofpoint.com/sites/default/files/misc/pfpt-us-sb-endpoint-data-loss-prevention-and-insider-threat-management.pdf, Oct. 2021, accessed Mar. 31, 2022, 7 pages, Proofpoint, Inc.

"Restrict access to documents with Information Rights Management in Word", online: https://support.microsoft.com/en-us/office/restrict-access-to-documents-with-information-rights-management-in-word-94aa8ab1-465e-42d7-a323-d61f911b2d0f, accessed Mar. 31, 2022, 8 pages, Microsoft.

"Stop Screenshots of Content—Disable Print Screen & Screen Grabbers—Prevent Copying", online: https://www.locklizard.com/stop-screenshots-grabbers/, accessed Mar. 31, 2022, 9 pages, Locklizard Limited.

Szigeti, et al., "What is your Elevator Pitch?", online: https://boldbets.cisco.com/type_idea/761/details, Oct. 2020, accessed Mar. 31, 2022, 4 pages, Cisco Bold Bets | Idea: Project Aegis.

Carielli, Sandy, "The State of Application Security, 2020", May 4, 2020, 16 pages, Forrester Research, Inc.

\* cited by examiner

AGENT/TENANT
800

Transaction
Monitor
802

Behavior
Model
804

Policy
Engine
806

Enforcement
Engine
808

START

1010

OBTAIN DATA REGARDING TRANSACTION ATTEMPTED BY USER ACCOUNT THAT HAS SUFFICIENT PRIVILEGES WITHIN ONLINE APPLICATION

1015

MAKE INFERENCE ABOUT DATA USING A BEHAVIORAL MODEL

1020

DETERMINE MITIGATION ACTION ACCORDING TO POLICY

1025

ENFORCE MITIGATION ACTION WITHIN ONLINE APPLICATION

1030

END

DETECTING ANOMALOUS TRANSACTIONS WITHIN AN APPLICATION BY PRIVILEGED USER ACCOUNTS

TECHNICAL FIELD

The present disclosure relates generally to computer systems, and, more particularly, to detecting anomalous transactions within an application by privileged user accounts.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect. To this end, various application performance management (APM) solutions have emerged that typically rely on instrumentation, which is the process of inserting code into an application, to capture performance data.

Performance monitoring using instrumentation may help ensure that a given application serves its users within guaranteed, required, etc. performance bounds. So far, instrumentation that has been used for APM has been implemented under the assumption that the given application has its own built-in security mechanisms. However, built-in security mechanisms tend to be binary in their operations: either a user account has sufficient privileges to perform a transaction or not. This means that an individual, while using the user account, could still abuse their privileges within the application (e.g., by performing data mining/exfiltration actions, etc.).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example simplified agent/tenant for detecting anomalous transactions within an application by privileged user accounts;

DESCRIPTION OF EXAMPLE EMBODIMENTS

Overview

Figure 1A:
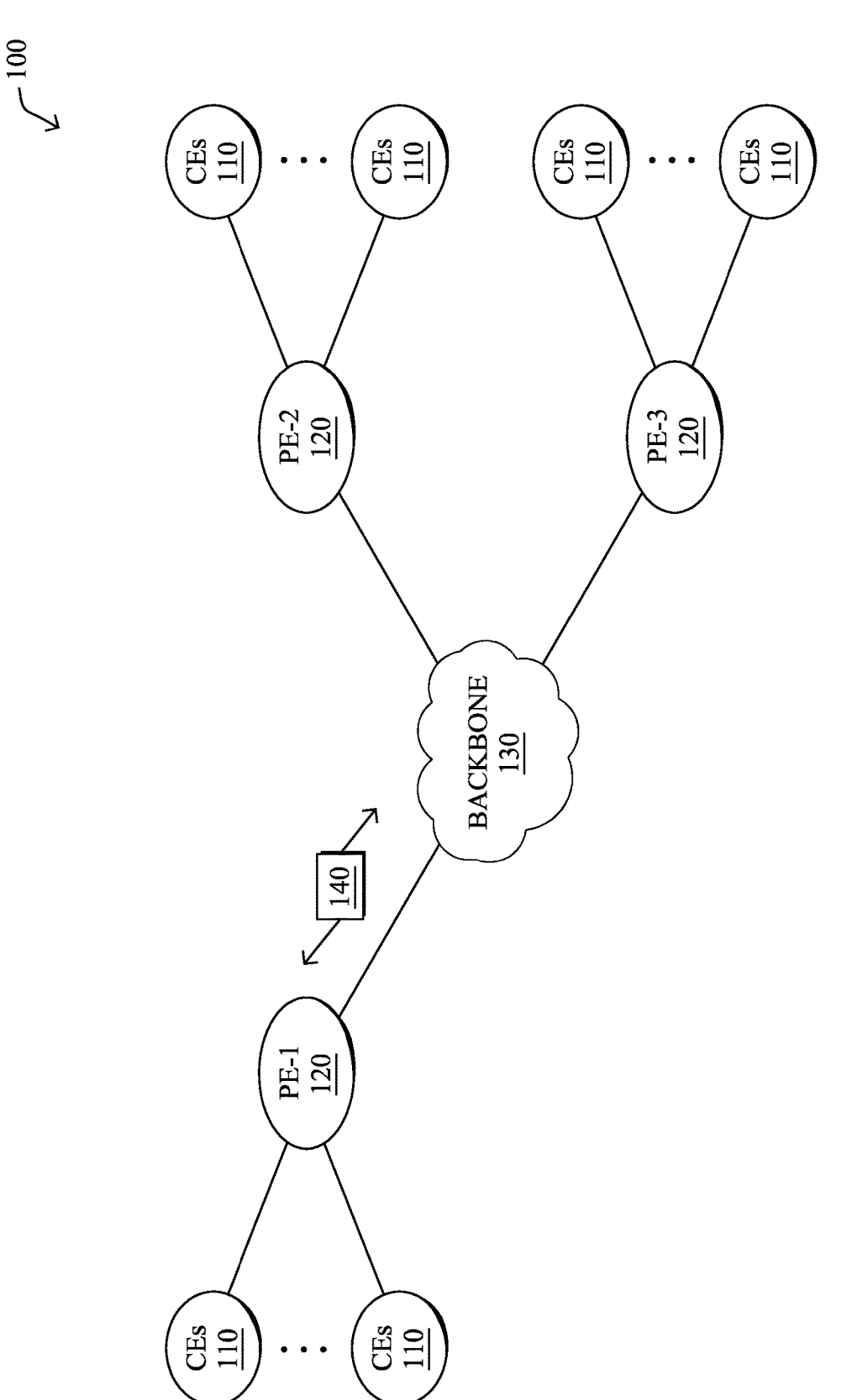
FIGS. 1A-1B illustrate an example computer network.

According to one or more embodiments of the disclosure, a device obtains data regarding a transaction attempted by a user account within an online application that is captured by instrumentation code that is inserted into the online application at runtime, wherein the user account has sufficient privileges within the online application to perform the transaction. The device makes an inference about the data regarding the transaction using a behavioral model. The device determines, based on the inference, a mitigation action for performance within the online application according to an enforcement policy. The device enforces the mitigation action within the online application.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node)

in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
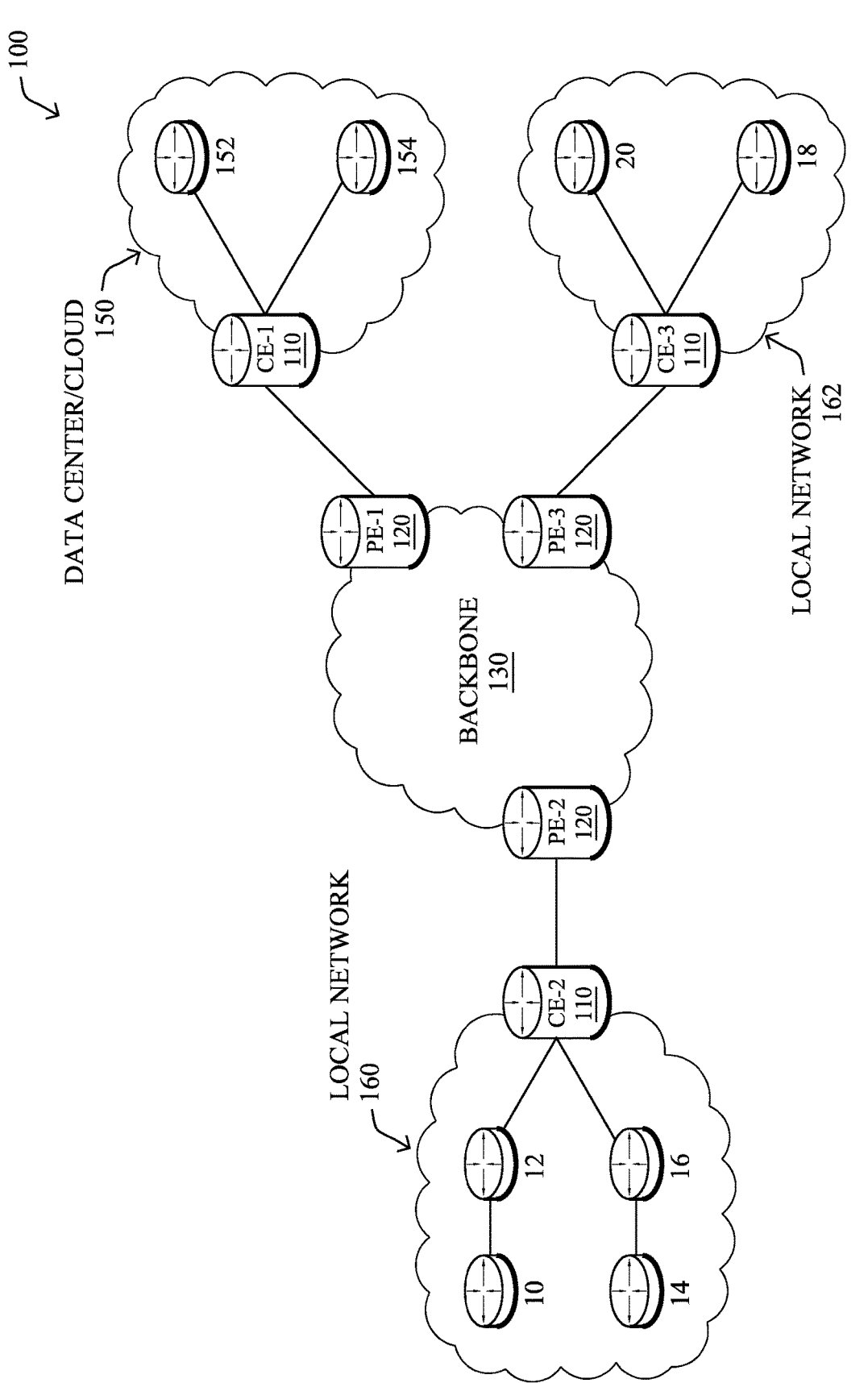

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
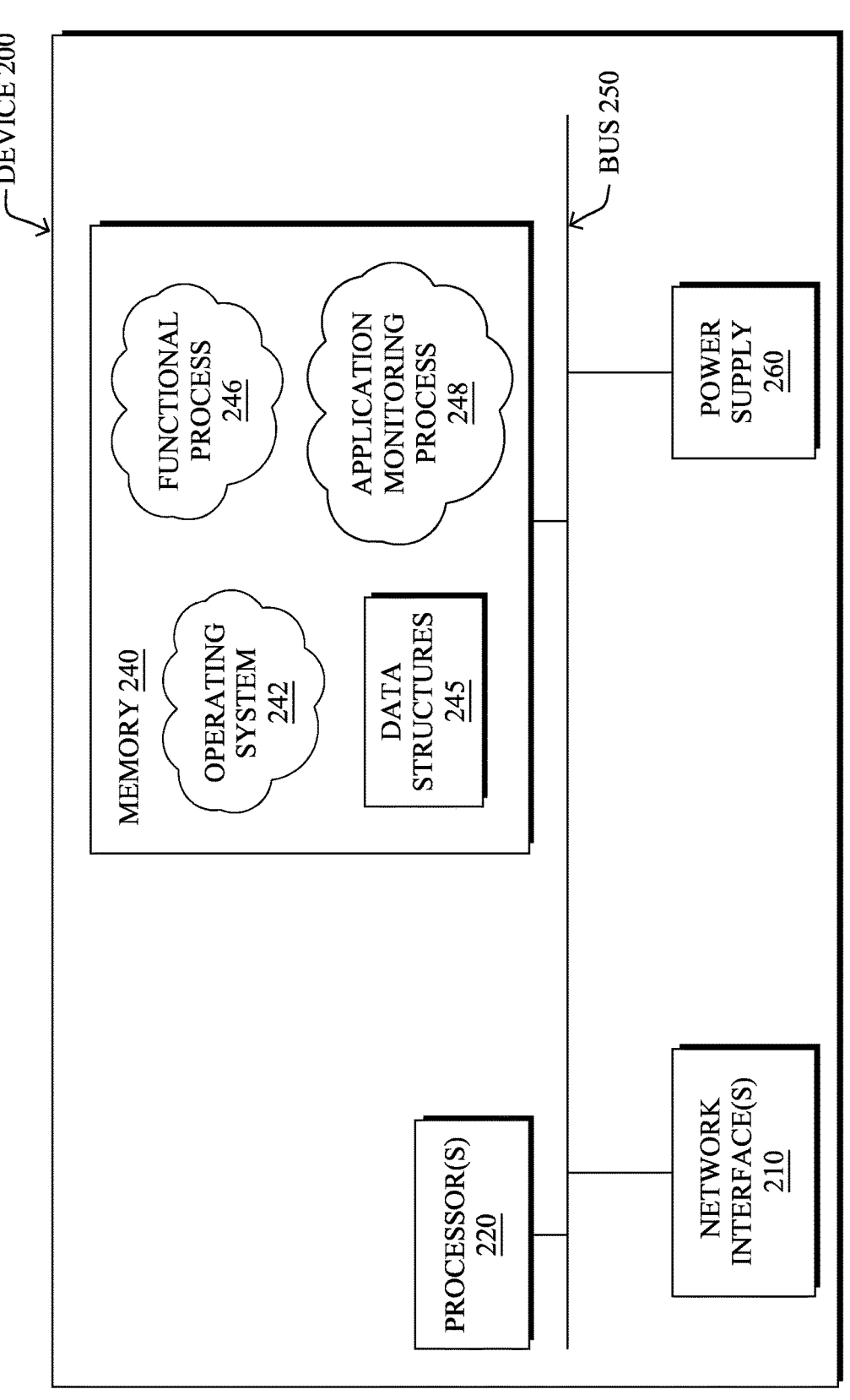
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the function-ality of a similar process). Further, while the processes have been shown separately, those skilled in the art will appre-ciate that processes may be routines or modules within other processes.

Application Intelligence Platform

The embodiments herein relate to an application intelli-gence platform for application performance management. In one aspect, as discussed with respect to FIGS. 3-5 below, performance within a networking environment may be monitored, specifically by monitoring applications and enti-ties (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
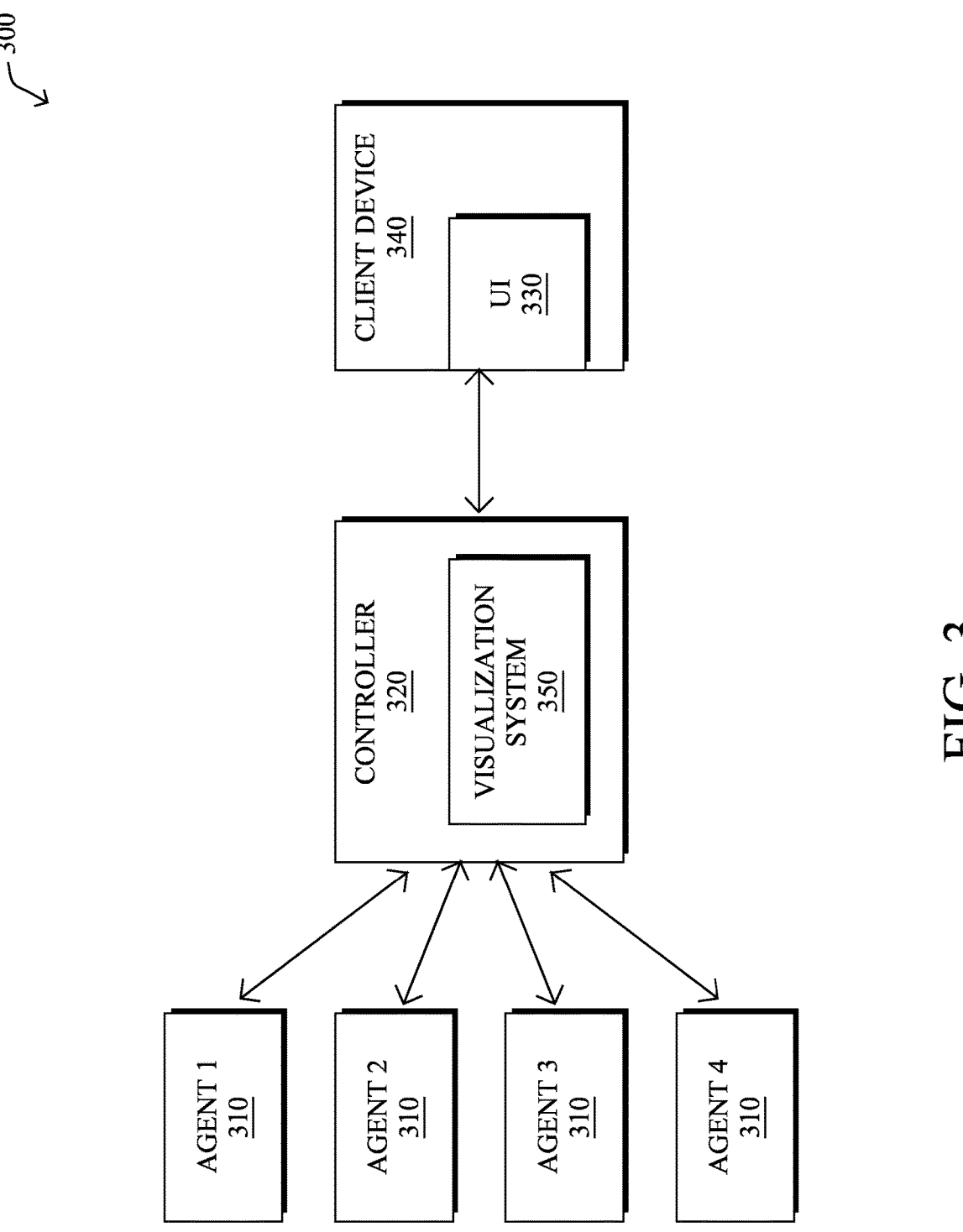
FIG. 3 illustrates an example application intelligence platform.

FIG. 3 is a block diagram of an example application intelligence platform 300 that can implement one or more aspects of the techniques herein. The application intelli-gence platform is a system that monitors and collects metrics of performance data for an application environment being monitored. At the simplest structure, the application intelli-gence platform includes one or more agents 310 and one or more servers/controllers 320. Note that while FIG. 3 shows four agents (e.g., Agent 1 through Agent 4) communica-tively linked to a single controller, the total number of agents and controllers can vary based on a number of factors including the number of applications monitored, how dis-tributed the application environment is, the level of moni-toring desired, the level of user experience desired, and so on.

The controller 320 is the central processing and admin-istration server for the application intelligence platform. The controller 320 serves a browser-based user interface (UI) 330 that is the primary interface for monitoring, analyzing, and troubleshooting the monitored environment. The con-troller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the inter-face 330. The interface 330 may be viewed as a web-based interface viewable by a client device 340. In some imple-mentations, a client device 340 can directly communicate with controller 320 to view an interface for monitoring data. The controller 320 can include a visualization system 350 for displaying the reports and dashboards related to the disclosed technology. In some implementations, the visual-ization system 350 can be implemented in a separate machine (e.g., a server) different from the one hosting the controller 320.

Notably, in an illustrative Software as a Service (SaaS) implementation, a controller instance may be hosted remotely by a provider of the application intelligence plat-form 300. In an illustrative on-premises (On-Prem) imple-mentation, a controller instance may be installed locally and self-administered.

The controllers 320 receive data from different agents 310 (e.g., Agents 1-4) deployed to monitor applications, data-bases and database servers, servers, and end user clients for the monitored environment. Any of the agents 310 can be implemented as different types of agents with specific moni-toring duties. For example, application agents may be installed on each server that hosts applications to be moni-tored. Instrumenting an agent adds an application agent into the runtime process of the application.

Database agents, for example, may be software (e.g., a Java program) installed on a machine that has network access to the monitored databases and the controller. Data-base agents query the monitored databases in order to collect metrics and pass those metrics along for display in a metric browser (e.g., for database monitoring and analysis within databases pages of the controller's UI 330). Multiple data-base agents can report to the same controller. Additional database agents can be implemented as backup database agents to take over for the primary database agents during a failure or planned machine downtime. The additional data-base agents can run on the same machine as the primary agents or on different machines. A database agent can be deployed in each distinct network of the monitored envi-ronment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored envi-ronment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline." The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
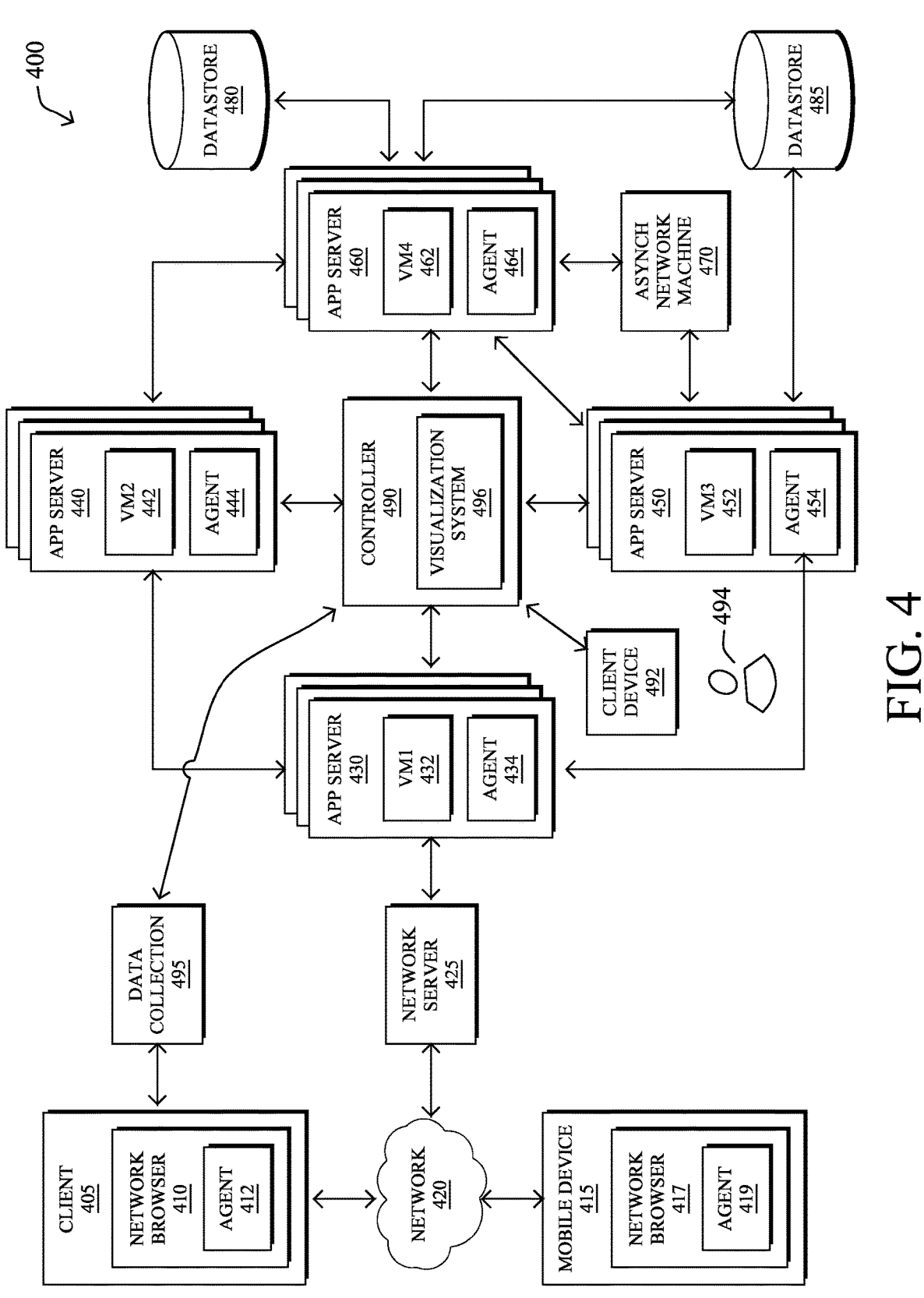
FIG. 4 illustrates an example system for implementing the example application intelligence platform.

FIG. 4 illustrates an example application intelligence platform (system) 400 for performing one or more aspects of the techniques herein. The system 400 in FIG. 4 includes client 405, client device 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection server 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor application 432 running in a virtual machine (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or mobile device 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client device 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
FIG. 5 illustrates an example computing system implementing the disclosed technology.
Figure 5:
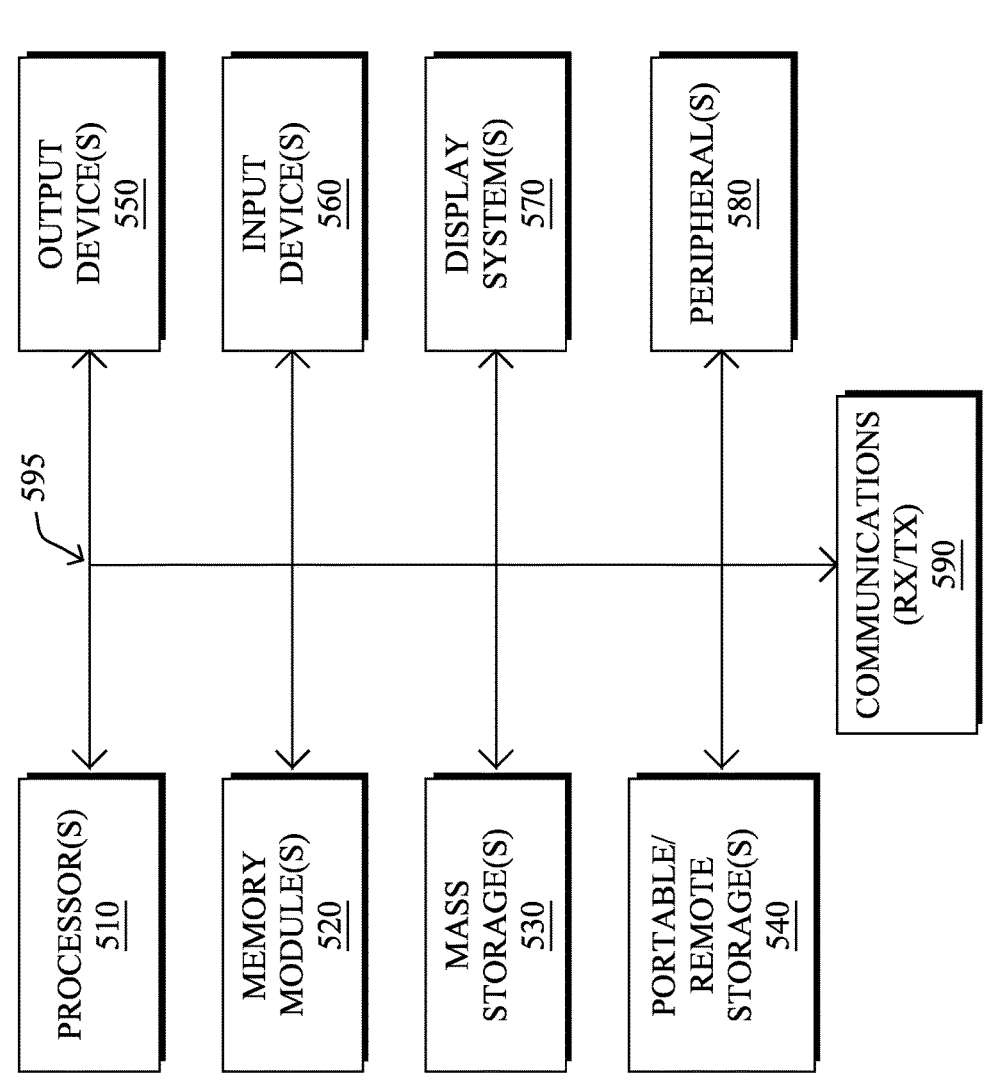

FIG. 5 is a block diagram of a computer system 500 for implementing the present technology, which is a specific implementation of device 200 of FIG. 2 above. System 500 of FIG. 5 may be implemented in the contexts of the likes of client 405, client device 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processor(s) 510 and memory 520. Main memory 520 stores, in part, instructions and data for execution by processor(s) 510. Main memory 520 can store the executable code when in operation. The system 500 of FIG. 5 further includes a mass storage device 530, portable/remote storage(s) 540, output devices 550, user input devices 560, display system(s) 570, and peripheral(s) 580.

The components shown in FIG. 5 are depicted as being connected via a single bus 590. However, the components may be connected through one or more data transport means. For example, processor(s) 510 and main memory 520 may be connected via a local microprocessor bus, and the mass storage device 530, peripheral(s) 580, storage(s) 540, and display system(s) 570 may be connected via one or more input/output (I/O) buses.

Mass storage device 530, which may be implemented with a magnetic disk drive or an optical disk drive, is a non-volatile storage device for storing data and instructions for use by processor(s) 510. Mass storage device 530 can store the system software for implementing embodiments of the present disclosure for purposes of loading that software into main memory 520.

Portable/remote storage(s) 540 may operate in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the storage(s) 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system(s) 570 may include a liquid crystal display (LCD) or other suitable display device. Display system(s) 570 receives textual and graphical information, and processes the information for output to the display device.

Peripheral(s) 580 may include any type of computer support device to add additional functionality to the computer system. For example, peripheral(s) 580 may include a modem or a router.

The components contained in the computer system 500 of FIG. 5 can include a personal computer, hand-held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

As noted above, a Java agent can be used for purposes of instrumenting a Java application. In general, a Java agent takes the form of a Java class that implements a premain method. Similar to the main method in a Java application, the premain method acts as an entry point for the agent. When the Java Virtual Machine (JVM) initializes, the premain method is called before calling the main method of the Java application. The Java agent may also include an agent-main method that can be used, after startup of the JVM. This allows the Java agent to be loaded either in a static manner (e.g., using premain as part of the JVM initialization) or in a dynamic manner, such as by using the Java attach API to call the agentmain method of the agent while the JVM is already running.

Associated with a Java agent may be a manifest that specifies a set of attributes for the agent, as follows:

TABLE 1

| Manifest Attribute | Description |
|---|---|
| Premain-Class | This attribute defines the Java agent class that includes the premain method to be used when the JVM initializes. |
| Agent-Class | This attribute defines the Java agent class that includes the agentmain method to be used after the JVM initializes. |
| Boot-Class-Path | This attribute specifies a list of paths to be searched by the bootstrap class loader. |
| Can-Redefine-Classes | This optional, Boolean attribute specifies whether the agent can redefine classes, with a default value of 'false.' |
| Can-Retransform-Classes | This optional, Boolean attribute specifies whether the agent can retransform classes, with a default value of 'false.' |
| Can-Set-Native-Method-Prefix | This optional, Boolean attribute specifies whether the agent can set native method prefix, with a default value of 'false.' |

When used, the Java agent can instrument the application via any or all of the following approaches:

Redefining or retransforming classes at runtime to change the bodies of methods, the constant pool, and/or attributes.

Modifying the failure handling of methods to allow for retry.

This allows the Java agent to monitor the performance of the application, apply security rules to the application, and the like.

Figure 6:
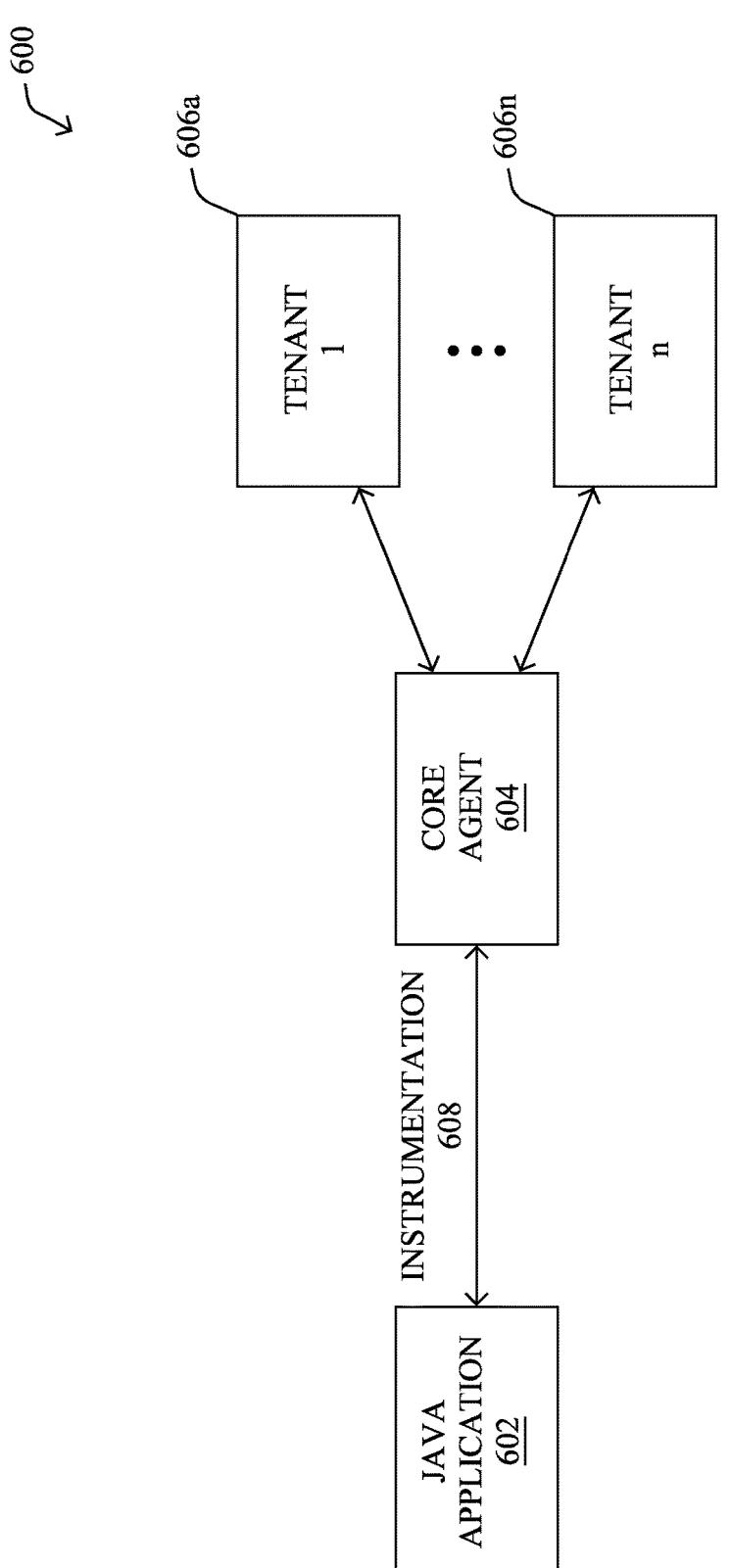
FIG. 6 illustrates an example simplified architecture for a multi-tenant agent.

FIG. 6 illustrates an example simplified architecture for a multi-tenant agent, according to various embodiments. As shown, architecture 600 may include a Java application 602, a core agent 604, and a plurality of tenants 606a-606n (e.g., a first through nth tenant). During operation, core agent 604 may function to insert instrumentation 608 into Java application 602 on behalf of tenants 606a-606n for any number of purposes. For example, in one embodiment, tenant 606a may be an APM utility that monitors the performance of Java application 602, while tenant 606n may be a Runtime Application Self Protection (RASP) utility that implements a number of security checks within Java application 602.

In some embodiments, Java application 602 may be a Java 9+ application executed within the Java Platform Module System (JPMS). As would be appreciated, a key distinction in JPMS over prior versions of Java is the support of 'Java modules' within an application, such as Java application 602. In general, a Java module may include the following information as part of a module descriptor:

A name that uniquely identifies the module.

A set of dependencies between that module and those on which it depends.

A listing of the packages that it makes available to other modules via export. Note that this must be done explicitly and that a package is implicitly unavailable to other modules, by default.

The services that are offered by the module.

The services that the module consumes.

The other modules that are allowed to use reflection with the module.

In addition to the module descriptor, each Java module may include any number of related packages (e.g., code) and, potentially, other resources (e.g., images, XML, etc.), as well.

More specifically, a module descriptor for a Java module may utilize any or all of the following directives:

exports—this directive specifies the packages of the module that are accessible by other modules.

uses—this directive specifies which service(s) are used by the module. In general, a service is an object for a class that implements an interface or extends the abstract class specified in this directive.

provides—this directive specifies that a module provides a particular service (e.g., the interface or abstract class from the uses directive), as well as the service provider class that implements it.

opens—this directive specifies the package(s) of the module that are accessible to other modules. Depending on its use, this directive can be used to allow all packages in the module to be accessed during runtime or used to limit runtime access by specified modules to certain modules.

A key feature of Java modules is the ability to restrict access between modules. Indeed, in Java version 8 and prior, the Reflection API could be used to access all classes in a package, including its private classes, regardless of the access specifier used. With Java modules, classes in packages within a module need to have permission to access a class and to perform reflection on a class. This is done by a module "exporting" itself and certain packages to another module that "reads" that module and its exported packages. In addition, a module can "open" itself to another module, to allow reflection.

To better describe the techniques herein, the following terminology is used:

ByteCode Instrumentation (BCI)—dynamically modifying Java classes for the purpose of instrumentation (e.g., instrumentation 608).

JMX MBeans—a managed Java object, similar to a JavaBeans component, that follows the design patterns set forth in the JMX specification. An MBean can represent a device, an application, or any resource that needs to be managed.

JMX Attribute—Defines a metric and metric data type exposed by the MBean.

Javassist—This is a popular BCI toolkit used to instrument classes.

Boot Class(es)—Core Java classes loaded by the "Boot Class" loader (Java bootstrap native loader).

Non-Boot Class(es)—Classes found about the Boot loader in Extension, Application, or Web Application loaders Handler—This is an intercepting class that contains a method to call on entry into an instrumented method and method to call on exit from an instrumented method.

Transform—The act of altering the class bytes before loading.

In general, tenants 606a-606n are specific functional modules that share core agent 604 with other tenants. In some embodiments, each tenant 606 may have its own, isolated class loader designed such that tenants 606a-606n do not conflict with one another. In further embodiments, each tenant 606 may have direct access to core agent 604 via the classes in core agent 604, which is the parent for the tenant class loader. During use, each tenant of tenants 606a-606n may reside in a specific "tenants" folder within core agent 604 and may be configured via .yaml files.

In various embodiments, core agent 604 may leverage the javaagent architecture built into Java and be configured via an agentConfig.yml or similar file. More specifically, core agent 604 may be divided into three areas:

Boot—this resides in the boot loader used to load Java application 602

Premain—this method resides in the application class loader and launches core agent 604 to set up the Agent Loader.

Agent Loader—this is the loader for core agent 604 and prevents conflicts with Java application 602. In addition, agent libraries are isolated from one another.

As noted, core agent 604 may leverage handlers, to insert instrumentation 608 into Java application 602. More specifically, handlers are instrumentation points to intercept or gain control of the method entry or exit within Java application 602 and controlled via configuration. For example, a handler may receive an object instance and all of its arguments within Java application 602, as well as the return value on exit and any exceptions that may be raised. In some embodiments, the handlers may use Reflection on any classes that are not in the boot loader (a core Java class), since those classes are directly accessible via a class loader designation. In further embodiments, the handlers can pass information via Thread Local and access other handlers in a same tenant of tenants 606a-606n (e.g., using an API call). Handlers also have the option of intercepting entry/exit events and catch exceptions via configuration, as well as receive the object instance and, on exit, all arguments, the return value, and any exceptions raised. Control over a single handler can be regulated a handler file, e.g., handler-name.properties.

In other words, core agent 604 may provide the following to tenants 606a-606n:

Isolation from other tenants of tenants 606a-606n (via Classloading).

Automatic JPMS compatibility—e.g., handling the complexities of Java 9+, such as module permissions, naming, class instrumentation, conflict resolution, removal, shutdown per tenant 606 without affecting tenants 606a-606n, security (e.g., the automatic handling of tenant permissions for Java Security Manager), etc.

Automatic thread naming based on the name of a tenant 606 (e.g., to ID tenant threads in stack sampling).

Automatic monitoring of tenant instrumentation measuring latency, CPU, etc. (and, if needed, to automatically remove the instrumentation).

Implementation of Async handling callbacks.

Ability to instrument anonymous classes, such as Lambda's, functions, inner classes, and the like.

Logging and log management.

Support for new technologies.

Context launch.

To do so, core agent 604 may include any or all of the following components, in various embodiments:

1. An easy to use JMX MBean/Server interface which can be used to publish data created by a handler (e.g., metrics) as attributes and make them accessible to JMX consoles, such as JConsole.

2. A built-in, optional, 'light' HTTP Web Server which can be used for diagnostics.

Special adaptors can also be used to enable any Java agent to be loaded into core agent 604. For example, these adaptors may accept an unaltered javaagent jar, unpack them, and launch them in the context of other services (e.g., offered by the MT agent adapter factor). In addition, core agent 604 may leverage an instrumentation toolkit such as Javassist, or the like, to perform the bytecode injection (BCI) of instrumentation 608 into Java application 602.

In the context of Java 9+, core agent 604 may be implemented in a modularized fashion and may use an 'extension' class to the premain bootstrap process that would discover all of the JVM modules, as well as the modules for core agent 604. The boot and premain sections have "unnamed" modules, and the agent loader section may be put into its own module called "AgentModule" or the like.

On bootstrap, a tweak is made to the "java.base" module that exports two packages required to complete the bootstrap. Immediately after that, any other required modules are loaded such as "java.sql," "jdk.httpserver," or the like. Note that these are not loaded by the JVM, by default. Then, the AgentModule of core agent 604 is created by loading all the .jars and packages in the Agent Loader of core agent 604, which was created in premain. In turn, TenantModule(s) are created for each tenant 606 found by core agent 604.

To enable tenants 606a-606n to instrument Java application 602, core agent 604 may perform the following:

Set the boot module (unnamed) to be able to read the AgentModule and TenantModules.

Set the AgentModule and TenantModules to export to the boot module (int boot Class Loader) Sets the premain module (unnamed) to be able to read the AgentModule and TenantModules.

Set the AgentModule and Tenant Modules to export to the premain module (e.g., in Application Class Loader).

Set ALL OTHER modules (e.g., non-agent) to export, to be read and be open to the AgentModule and Tenant Modules. In addition, ALL Tenant modules export to the Agent Module and also are open to the Tenant Module.

After startup, ANY new modules are reported during the Class Review (from new transforms) and are also set to export, be read, and be open to the Agent Module.

Startup of core agent 604 can be achieved either as a standalone Java agent, or via other pluggable adapters offered by the multi-tenant agent. For example, to launch core agent 604 as a standalone Java agent, the -javaagent switch can be added to the startup, similar to the following:

java-javaagent:prod/lib/javaagent.jar=agentConfig.yml

As noted, handlers of core agent 604 receive control during entry, exit, or exception events of a method. An example of such a handler is as follows:

MethodHandler will receive calls on initialization and method entry, method exit:

```
public static interface MethodHandler
{
public void initProxy(String launchFrom, String agentArgs,
Instrumentation instHandle);
public void handlerEntry(Object inst, Object[ ] args,
String className, String method, String signature, String id);
public void handlerExit(Object return Val, Object inst,
Object[ ] args, String
className, String method, String signature, String id);
}
```

Instrumentation 608 by core agent 604 can be achieved in a number of ways. For example, the following illustrates one potential implementation that can be added to agentConfig.yml for core agent 604:

```
agent-instrumentation-properties:
preloadClasses: // preload classes on startup
noTransformClass: agent.Java,com.singularity,com.appdynamics
    // don't transform these packages
```

-continued

```
noTransformLoaderClassName:
    JavassistAgentClassLoader,com.singularity,com.appdynamics
    // don't transform from these loaders
noTransformThreadName: // don't transform if this thread
name classReviewInterval: 10 // how often to review new classes
(in seconds)
useClassDefinitionTransform: true // To instrument in the "middle"
    of the class definition (experimental)
useAnonymousClassTransform: true // To instrument anonymous
    classes (experimental)
useInitialTransform: false // To instrument in the initial class
    transform (experimental)
showJMX: false // show instrumentation or other metrics in JMX
```

Likewise, a lightweight server (e.g., part of the JVM) can be loaded to process service requests for diagnostics or other reasons via agentConfig.yml. For example:

```
agent-server-configuration:
    keystorePassword: javaagent
    keystoreFile: javaAgentServerKeystore.jks
    sslProtocol: TLSV1.XINONE
    username: admin // requests should use basic
    auth and specify this username
    password: ********** // requests should use
    basic auth and specify this password
    port: 8000 // port to listen on
    authenticate: truelfalse // requires username
    and password (via basic authentication)
```

Creation of a tenant 606 can be achieved by creating a named Tenant folder that includes the following subfolders:

config: this subfolder should include:

All handler property files (optional)

The tenant config file (called tenantConfig.yml) which specifies the instrumentation information lib: this folder should include the .jar files which should be included in the Tenant Class Loader For example, the following can be included in tenantConfig.yml to implement instrumentation for the tenant 606 that overrides the global guidance for that tenant:

```
tenant-specific-instrumentation-properties:
preloadClasses: // preload classes on startup
noTransformClass: agent.Java,com.singularity,com.appdynamics
    // don't transform these packages
noTransformLoaderClassName:
    JavassistAgentClassLoader,com.singularity,com.appdynamics
    // don't transform from these loaders
noTransformThreadName: // don't transform if this thread name
```

Similarly, tenantConfig.yml may also specify the instrumentation specifics for that tenant 606 in terms of handlers. For example:

```
tenant-instrumentation:
class: name[,name,name,etc.] method: method[,method,method,etc.]
signature: signature[,signature,signature,etc.] handler: handlers.name
interface: true|false // Use this if the Class/Method specified is abstract (Extended or
    an interface)
catch: true // use this to pass the Exception instead of return Val for method exit calls
load: true|false // load handler on startup
inactive: true|false // Whether or is active
entry: true|false // Instrument method entry for method
exit: true/false // Instrument method exits for method
entrycode: java code // Optional code to execute on entry (one can specify
    $STANDARD$ to insert the standard proxy handler calls)
exitcode: java code // Optional code to execute on exit (one can specify
    $STANDARD$ to insert the standard proxy handler calls)
condition: System property name // Apply ONLY if this property is true
```

15

When specifying a custom entrycode or exitcode that will take place of the default entry/exit calls, it must have the proper Java syntax. More specifically, ';' must be used between Java coding lines. In addition, some of the Javaassist tokens can be used, which will be converted at runtime, such as the following tokens:

$0, $1, $2, . . . this and actual parameters $args—An array of parameters. The type of $args is Object[ ].

$$—All actual parameters. For example, m($$) is equivalent to m($1,$2,.)

$cflow(. . . )—cflow variable $r—The result type. It is used in a cast expression.

$w—The wrapper type. It is used in a cast expression.

$_—The resulting value $sig—An array of java.lang.Class objects representing the formal parameter types.

$type—A java.lang.Class object representing the formal result type.

$class—A java.lang.Class object representing the class currently edited.

The standard method handler calls (e.g., the default entry/exit calls) are as follows:

public static void handlerEntry(Object inst, Object[ ] args, String className, String method, String signature, String id, String handlerName) { public static void handlerExit(Object returnVal, Throwable t, Object inst, Object[ ] args, String className, String method, String signature, String id, String handlerName)

Any handler can also add a URL context, and will receive inbound messages to the JavaAgentServerinterface implementation, to the server using code similar to the following:

JavaAgentServer server=JavaAgentServer.getInstance( ) server.addService(false, "/testhandler", this);

A handler can also have a properties file (handlername.properties) for configuration and must be located in the Tenant folder. For example:

Example   (TestHandlerMethodProxy.properties):   test-.monitor.interval=10000

While performance monitoring may help ensure that a given application serves its users within guaranteed, required, etc. performance bounds. So far, instrumentation that has been used for APM has been implemented under the assumption that the given application has its own built-in security mechanisms. These security mechanisms, however, may at times be inadequate, sidestepped, or even taken advantage of. For example, one type of act that an application may be not be configured to address are malicious insider acts, including privileged user abuse (also known as information technology (IT) sabotage). Privileged user abuse may be extraordinarily harmful and costly (more than just monetarily) for an organization.

According to the Computer Emergency Response Team™ (CERT), IT sabotage occurs when current or former employees, contractors, vendors or business partners intentionally exploit an authorized level of access to applications, data, systems, or networks with the intention of harming a specific individual or an organization. Notably, a trusted user with privileged access to an application oftentimes may use the application with native security mechanisms disabled within the application. For instance, this may be done by the trusted user disabling the security mechanisms or by default (e.g., the application is preconfigured to have no or fewer security mechanisms enabled due to the trusted user's status). In other examples, privileged access that is conventionally given to trusted users may include access to hardware systems (e.g., network routers, switches, firewalls, etc.), software systems (e.g., applications, microservices, APIs, etc.), data, and any other type of information system.

Typically, trusted users with privileged access are the most at risk for committing IT sabotage. Examples of IT sabotage vary widely, based on an actors knowledge and motivation, and may include: a disgruntled worker at a company with administrator rights to an application deleting thousands of user accounts shortly before he or she leaves the company; an IT administrator committing sabotage by changing router passwords and disabling the server after quitting a building products distributor; a recently fired system administrator extorting his or her former employer by refusing to reveal administrator passwords; and a system administrator of a financial institution, having been fired without any notice, using a remote access connection to shut down servers of the financial institution for numerous days.

Instrumenting Applications to Prevent Abuse by Privileged Users

The techniques herein introduce instrumenting applications to prevent abuse by privileged users. In some aspects, stakeholders and/or organizations that own, operate, manage, run, etc. a particular application are protected due to enforced step-up authentication by "peers" of a given privileged user, at a per transaction or a per microservice level. It is contemplated that the enforced step-up authentication may be enabled across various information technology assets (e.g. for example, applications, databases, Kubernetes clusters, networks, etc.) of an organization, in some implementations, through a multi-factor authentication proxy agent. As such, re-engineering or applications or other systems is generally not required. Particularly, an agent may be situated alongside an application, database, etc. and managed by a centralized controller. If a privileged user initiates a task, transaction, etc. at an asset (e.g., application, database, etc.) that a) has been previously identified as "risky" and b) has not been authorized and scheduled as an approved change (e.g., by IT service management (ITSM) of an organization), then approval for the task, transaction, etc. may be requested from peers of the privileged user (e.g., other administrators with a same level of access). In an example, SMS text or MMS messages may be sent, where the peers may approve or deny the requested action, and, it is contemplated where the requested action is deemed malicious, privileged access may be immediately revoked.

In one or more embodiments, the requested approval from peers of the privileged users may be implemented using an expedited and improved decision approval process. In particular, rather than using a traditional chain-of-approval, a pool of predominantly peer approvers is leveraged, wherein each individual approver is continually and dynamically rated according to the reliability of their approval-decisions. This rating may be done computationally or by peer-ratings (or by even combinations thereof). The potential gravity of the request to be approved may be a factor in determining a composite score that needs to be achieved in order to approve the decision. For example, actions that have severe potential consequences will require a higher aggregate score in order to be approved, and vice-versa. Decisions with broad implications would thus typically require a quorum of reliable peer approvals to proceed.

With reference again to FIG. 6, core agent 604, which may be from time-to-time be described as a multi-tenant agent, may be used to gather application runtime telemetry to be consumed by multiple independent systems (i.e. "ten-

24 oversee instrumentation missteps, removing the burdens associated with supporting a full Java agent across multiple vendors.

Because core agent 604 may be used to gather telemetry for multiple systems (e.g., via a tenant of tenants 606a-606n), multiple application agents from different vendors are enabled to concurrently run on a single application (through core agent 604), which may potentially present a variety of risks (e.g., in terms of cybersecurity, abuse of user privileges, etc.). A given tenant of tenants 606a-606n may be implemented using bytecode interception (BCI) to as to pause execution of an application program, for example, java application 602. BCI, in combination with logic and integrations with various policy enforcement systems that are external to the application program (e.g., a multifactor authentication system, notification and/or approval system, etc.), may be implemented to address the risk presented with core agent 604. For example, this combination may be used for detection and identification unauthorized data mining actions by authorized users of an application (e.g., java application 602). After the detection and identification, one or more policy actions may be enforced by a tenant, through core agent 604, in real time using mechanisms external to a runtime domain of the application (e.g., to halt a detected and identified data mining operation).

Stated another one, a given tenant of tenants 606a-606n, in combination with core agent 604 that runs on top of java application 602 (and without impeding or haring execution of java application 602) may prevent class loading errors and/or module system errors from occurring within java application 602. To this end, a tenant performing this function may be implemented with a handlerEntry function such as:

```
public void handlerEntry(Object inst, Object[ ] args, String className, String method,
String signature, String id) {
Object requestObject = args[0];
Object responseObject = args[1];
authenticationStatus.set(true);
String url = getFullURL(requestObject);
mtAgentTenantAPI.log("Received inbound request: " + url);
// Redirect coming from DUO
if (isDuoAuthenticatedResponse(url)) {
mtAgentTenantAPI.log(">>>>> Redirected Transaction coming from DUO. . ." + url);
return;
}
RuleInfo = getRuleMatch(url);
if (ruleInfo == null) {
return;
}
String authenticatedUsername = getUserPrincipal(requestObject);
if (authenticatedUsername == null) {
authenticatedUsername = defaultUser;
}
UserRuleInfo = getUserForRule(authenticatedUsername, ruleInfo.name);
userRuleInfo.currentInstance++;
String currentAction =" ";
``` ants," as the name of the agent itself implies), as described herein above. Stated another way, core agent 604 may be a Java agent that allows multiple tenants to share use of the agent for purposes of instrumenting an application. Of note, the multi-tenant agent allows different technologies, such as APM, RASP, etc., to coexist and across different vendors. Additionally, core agent 604 may support the complexities of JPMS in Java 9+, to provide proper classloading and to The tenant may additionally be configured to perform a) blocking/preventing of request actions, operations, etc., b) triggering a multi-factor authentication, c) triggering a notification (e.g., within an application or tenant) to be sent to other users (than one that initiated an action, operation, etc.), d) triggering a text messaged notification (SMS) to other users. These actions may be implemented using, as examples:

```
// Block Action
if (userRuleInfo.doBlock || (userRuleInfo.currentInstance >=
ruleInfo.actionInstances[BLOCK_ACTION] &&
ruleInfo.actionInstances[BLOCK_ACTION] > 0)) {
currentAction = coreActions[BLOCK_ACTION];
mtAgentTenantAPI.log("Blocking on instance: " + userRuleInfo.currentInstance);
doDialog(responseObject, authenticatedUsername, url, "blockPopup.js");
}
// Trigger an MFA Action
else if (userRuleInfo.currentInstance == ruleInfo.actionInstances[MFA_ACTION]) {
currentAction = coreActions[MFA_ACTION];
mtAgentTenantAPI.log("Sent MFA on instance: " + userRuleInfo.currentInstance);
doMFA(responseObject, authenticatedUsername, url);
}
// Trigger a NOTIFY
else if (userRuleInfo.currentInstance == ruleInfo.actionInstances[NOTIFY_ACTION]) {
currentAction = coreActions[NOTIFY_ACTION];
mtAgentTenantAPI.log("Sent Notification on instance: " +
userRuleInfo.currentInstance);
doDialog(responseObject, authenticatedUsername, url, "warningPopup.js");
// Trigger an SMS notification
} else if (userRuleInfo.currentInstance == ruleInfo.actionInstances[SMS_ACTION]) {
currentAction = coreActions[SMS_ACTION];
mtAgentTenantAPI.log("Sent SMS on instance: " + userRuleInfo.currentInstance);
String subject = "Security Alert (violation rule: " + ruleInfo.shortName + ") for user " +
authenticatedUsername;
if (ruleInfo.notifyList.size( ) > 0) {
for (String notify : ruleInfo.notifyList) {
sendMail(notify, subject, getDecisionContent(authenticatedUsername), "text/html");
}
} else {
mtAgentTenantAPI.logWarning("No notification list for notifying. . .");
}
}
addCall(url, authenticatedUsername, userRuleInfo.currentInstance, currentAction);
```

Figure 7A:
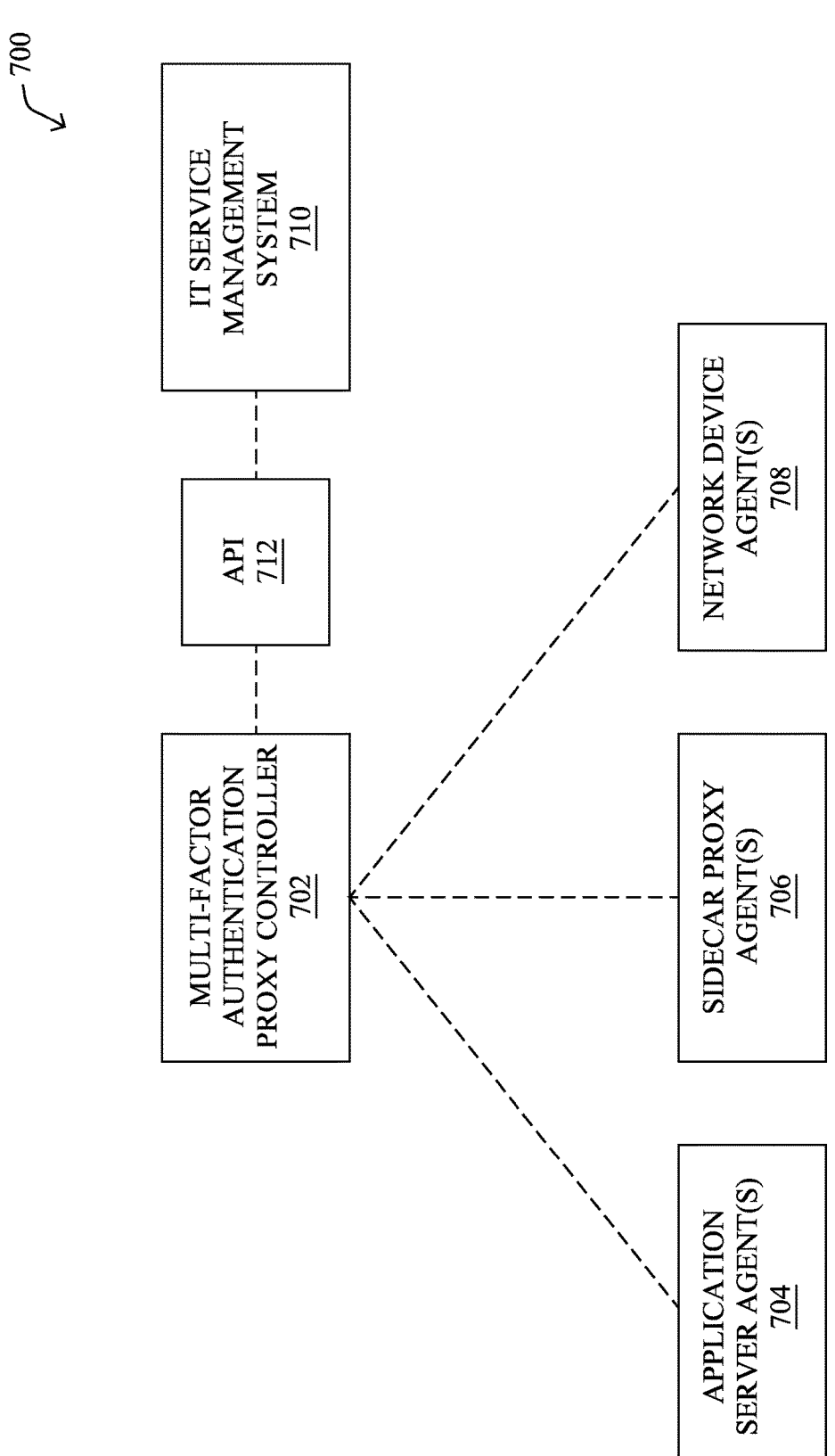
FIGS. 7A-7E illustrate an example simplified architecture for instrumenting applications to prevent abuse by privileged users.

FIGS. 7A-7E illustrate an example simplified architecture for instrumenting applications to prevent abuse by privileged users. Notably, architecture 700, as shown in FIG. 7A, may comprise a multi-factor authentication proxy controller 702 that is in communication with a plurality of application server agents 704, a plurality of sidecar proxy agents 706, and a plurality of network device agents 708. Generally, each of plurality of application server agents 704 may execute core agent 604 that, as described herein, is enabled to identify specific transactions within a server application, for example, a user related to a transaction, a role of the user, details of the transaction, etc. In addition, core agent 604 may be used to enforce multi-factor authentication (MFA) and/or continuous MFA (CMFA) for specific transactions within the server application and any of the additional actions, for example, blocking a transaction, notifying a user, etc., as described with respect to FIG. 6. In one or more embodiments, it is contemplated that the MFA or CMFA may be additionally implemented so as to provide specific contextual information that can be used in the determination and feeding into the one or more machine learning and/or artificial modules described herein (e.g., a user's location at accessing, time of day at location, etc.).

In the context of cloud-native application architecture, functionality of core agent 604 may be enabled by implementing a proxy, shown as sidecar proxy agents 706 in FIG. 7A, which may be described from time-to-time as a multi-factor authentication proxy (MFAP). Accordingly, in such architectures, core agent 604 may at a microservice level be enabled to enforce MFA, block a transaction, etc. As a proxy, MFAP may be further enabled to run on hardware platforms using as plurality of network device agents 708 (e.g., on a network switch or a router), so as to trigger MFA for specific action(s) or to grant users specific levels of access. Notably, network device agents 708 may implemented one or more function for core agent 604 as a containerized application on a given network device. For instance, when a user attempts to a change an "enable password setting" which conventionally requires a highest level of privileged access for network devices, changing the enable password requires the highest level of access (level 15 access on Cisco devices); such an action could be gated by the MFAP on the network device.

Multi-factor authentication proxy controller 702 may be an or in communication via an API 712 for IT service management system 710, where multi-factor authentication proxy controller 702 is configured to perform send, receive, etc. a number of notifications from IT service management system 710. It is to be understood that, conventionally, there is more than a single administrator for a given type of IT system. For example, it is common practice in most IT departments to have multiple administrators for applications, databases, systems, networks, etc. That is, it is understood that in most IT systems, it would be severely limiting to have only a single administrator because if he or she were unavailable, then necessary administrative functions could not proceed until their return, which would thus carry an unnecessary impact to the general productivity of the organization (not to mention the additional exposure of the organization to privileged user abuse).

Multi-factor authentication proxy controller 702 may be configured to receive, store, etc. lists of authorized administrators for a given IT system (e.g. applications, databases, containers, network devices, etc.) as well as corresponding notification mechanisms of the authorized administrators (e.g., a mobile phone number for text messages). Additionally, multi-factor authentication proxy controller 702 may be configured (e.g., by an administrative team for a given IT system) to store a list of specific transactions and/or microservices to be gated, monitored, etc. in architecture 700 by instrumenting applications to prevent abuse by privileged users. These transactions may include privileged user tasks such as: a) adding or deleting more than x number of users within an IT system within a day; b) enabling or disabling specific policies for the IT system (e.g., access policies, encryption policies, etc.); c) making critical configuration changes to the IT system (e.g., architecture modifications, turning on/off functions, etc.); d) capturing information from the IT system; or e) changing one or more passwords and/or security credentials to the IT system.

Figure 7B:
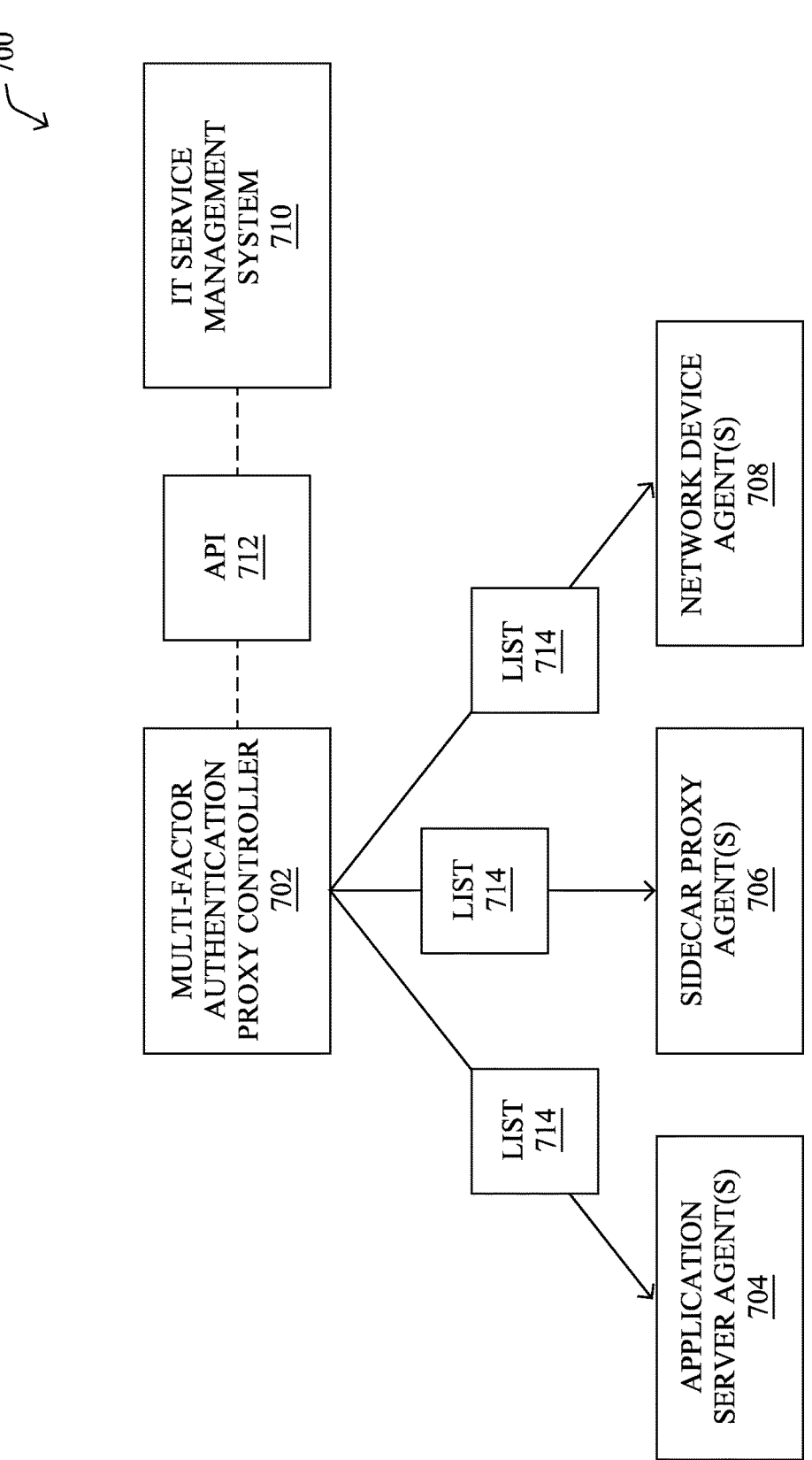

As shown in FIG. 7B., multi-factor authentication proxy controller 702 may be configured to communicate the list of specific transactions and/or microservices to be gated, monitored, etc. as messages 714 to respective MFAP agents executing on application server agents 704, sidecar proxy agents 706, and network device agents 708. As noted, multi-factor authentication proxy controller 702 may be integrated with IT service management system 710 (e.g., ServiceNow™) using API 712, such that multi-factor authentication proxy controller 702 is aware of any approved and scheduled actions (changes, modifications, additions/deletions, etc.), details of system(s), users, etc. involved, objects/targets of the actions, etc.

Figure 7C:
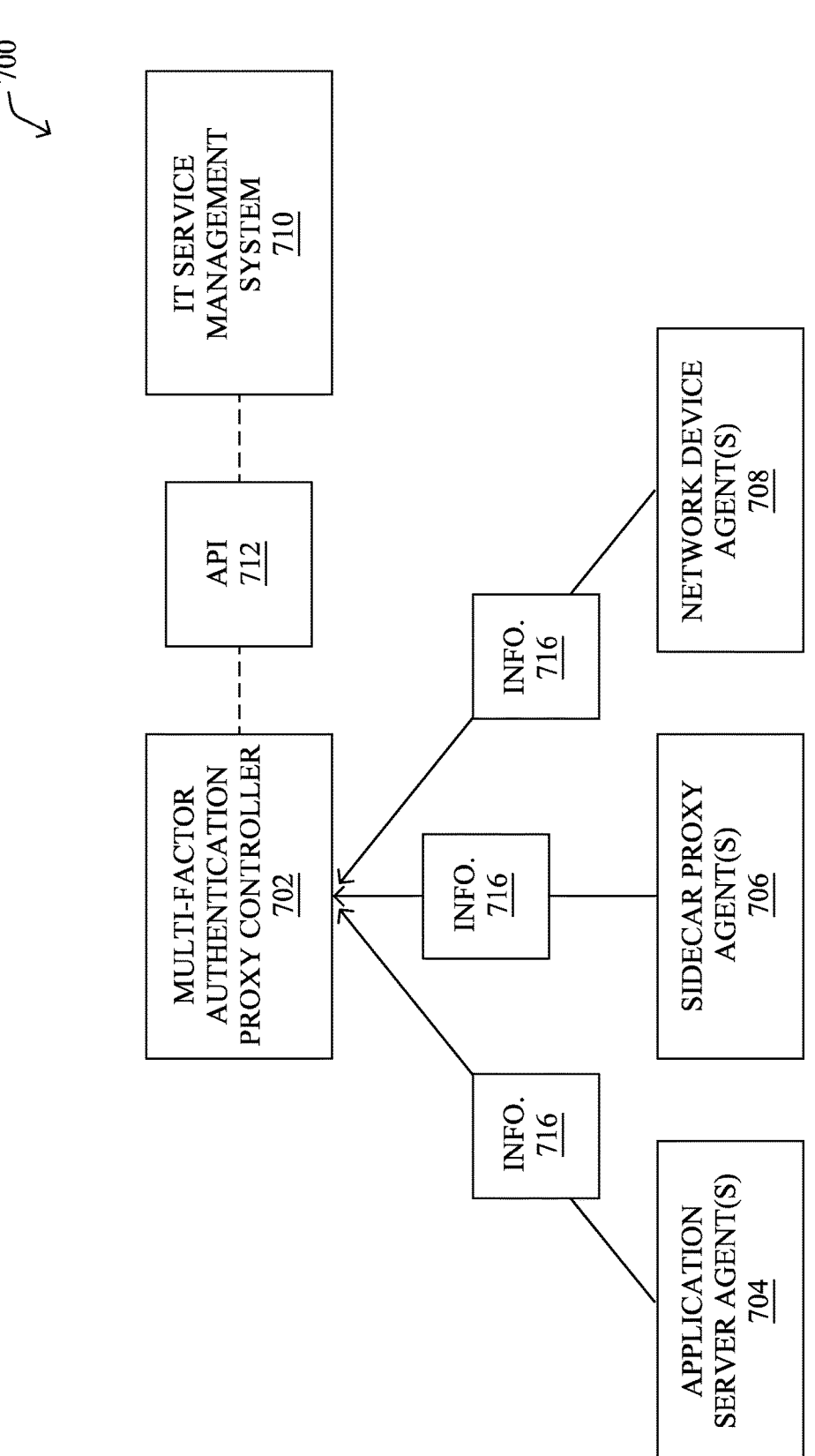

Generally, each of application server agents 704, sidecar proxy agents 706, and network device agents 708 to monitor, using instrumentation described herein above and based on obtained lists of transactions, whether a gated transaction or microservice is being initiated. As shown in FIG. 7C, if one is observed, a given agent is configured to intercept the request and to send username and transaction information as messages 716 to multi-factor authentication proxy controller 702. Examples of such messages may include:

user1@ITsystemA.com is requesting to delete 100 user accounts from application A;
    user2@ITsystemA.com is requesting to delete Kubernetes cluster B;
    user1@ITsystemB.com is requesting to change the encryption policy for microservice C from strict to permissive;
    user2@ITsystemB.com is requesting to change the admin password of network device D; and
    user1@ITsystemD.com is requesting to change the access policy of firewall E.

Upon obtaining one or more of messages 716, multi-factor authentication proxy controller 702 may be configured to determine whether an action indicated by a given message falls within a list of approved changes, actions, etc. (e.g., obtained from IT service management system 710). If the action is an approved one, then the action may be permitted to proceed by multi-factor authentication proxy controller 702.

Figure 7D:
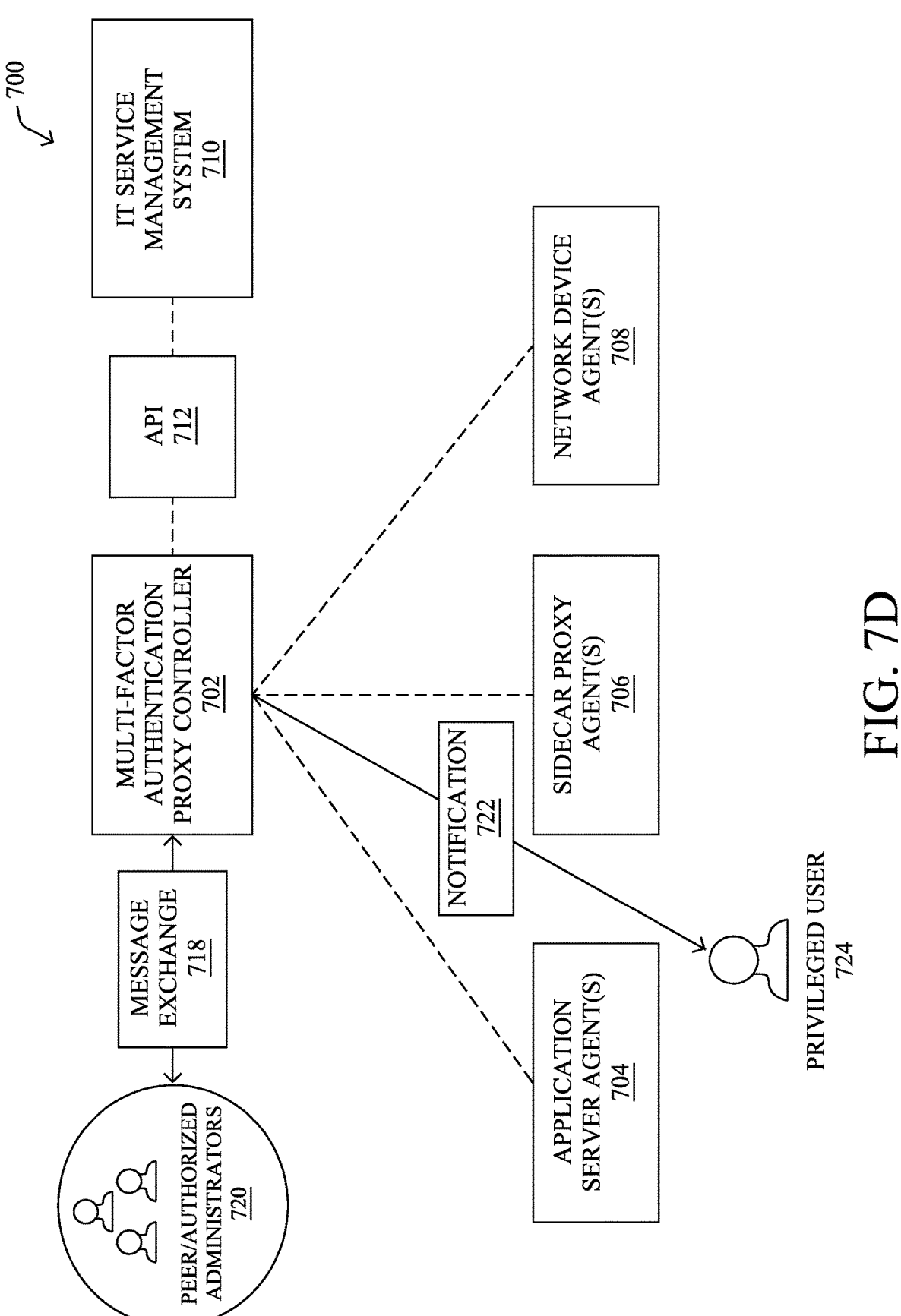

If the action is an unapproved one, then multi-factor authentication proxy controller 702 is configured to exchange notifications and/or messages 718 to other administrators 720 within the IT system where the attempted action has taken place based on. As shown in FIG. 7D, multi-factor authentication proxy controller 702 may be configured to exchange messages 718 (e.g., via SMS) to the other authorized administrators in a same group of the privileged user that has attempted an action, along with instructions of how to approve or deny the request (e.g., messages 718 may comprise a series of exchanges or checks). For example, a message via SMS may be "User user1@ITsystemA.com is requesting to delete 100 user accounts from application A. Enter Y to permit or N to deny," and authorized users that receive this message may reply with an appropriate response. In another embodiment, the notification may be sent to an application associated with multi-factor authentication proxy controller 702 and/or IT service management system 710. Messages 718 that are exchanged may, in addition to or in lieu of SMS, may be based on any individual or combination of a secure communications channel, an authenticated channel, an application in a mobile device or browser, an SMS, MMS, a phone call, etc. For example, in an embodiment using MMS, a pre-agreed image may be sent to approvers, as understood by one having skill in the art. It is contemplated that exchanging messages 718 may be an open exchange or pre-authenticated, so as allow multi-factor authentication proxy controller 702 to be "continuous."

Furthermore, it is contemplated that prior to or as part of exchanging messages 718 with other administrators 720, multi-factor authentication proxy controller 702 may be configured to initiate an administrator to perform one or more multi-factor authentication (MFA) and/or continuous MFA procedures/protocols. Notably, such additional MFA requirement would ensure and/or enhance trust in a given "vote" by a peer/authorized administrator. It is contemplated that the message described above may include a URL to a particular MFA procedure/protocol that is required to be completed for a vote to be considered in determining, by multi-factor authentication proxy controller 702, whether an action is to be approved. Additionally, more than one authentication check is contemplated being required for a particular action to occur. That is, a single authentication check or multiple authentication checks may depend on a) a context from API 712 or from a response in messages 718 orb) whether any of the peer/authorized administrators are online.

When the required number of authorized administrators have approved the requested action, then multi-factor authentication proxy controller 702 is configured to permit a requested the MFAP to continue the action. It is contemplated that a notification 722 (e.g., an SMS message) may be sent to privileged user 724 who initiated the request, including the details of which of his/her peers approved the action. It is contemplated that some actions may only require a single peer administrator to approve, while other actions may require multiple peer administrators to approve, due to the higher risk of the requested action to the organization. Further, as will be described further herein below, for actions that require multiple peer administrator approval, such decisions may be based on one or more quorum settlement policies that multi-factor authentication proxy controller 702 is configured to apply (achieve timely, yet reliable, approval-decisions).

In situations where the requested action is not approved by a peer administrator (or a sufficient percentage, number etc.) of peer administrators, then multi-factor authentication proxy controller 702 is configured to instruct the MFAP to indefinitely intercept the requested transaction. Further, a corresponding SMS message, notification, etc. may be sent to a privileged user, presumably a rogue administrator, that initiated the action which has been denied. For example, such message may be: "You have requested to change to delete 100 user accounts from application A; however, this has not been approved by your peer administrators within the required time. The requested action will not be permitted to proceed." Such message may inform the requested privileged user why the requested action is not proceeding (e.g., due to policy, due to a technical error, etc.).

Additionally, it is contemplated that a peer administrator may consider a requested action to be abusive, indicative of malicious activity, etc. to the point that such action would generally require a responsive action. In such scenarios, multi-factor authentication proxy controller 702 may be configured to send, in messages 718, an additional option(s). For example, one option may be to revoke privileges of the user, reporting the user's actions to security personnel, etc. Such option may be, for example, "User user1@ITcompanyA.com is requesting to delete 100 user accounts from application A. Enter Y to permit or N to deny. Enter XXYYZZ to temporarily revoke all privileged access for user user1@ITcompanyA.com."

Enhanced Composite Quorum Settlement

Generally, quorum-based voting systems have long been used in technology. For example, quorum-based systems are often used when multiple, redundant technical elements exist within a system. For example, a three control point handling may be implemented for critical functions such as disk writes, vehicle controls, etc., where a majority of the systems must "vote" towards a common outcome for that outcome to be realized and expressed. However, such quorum-based systems, as used in technical settings to drive technology outcomes or decisions, are typically relatively simple in that they are oftentimes binary decisions (e.g., does something work or not, is something approved or not, etc.). That is, these systems may lack nuanced characteristics that are required to be applied to larger technical approvals within an organization when moving beyond relatively simple, point-focused tasks. One such scenario that may be determining whether a sufficient number or specific combination of peer/authorized administrators approve a privileged user's action within an IT system, as described above with respect to FIGS. 7A-7D.

Figure 7E:
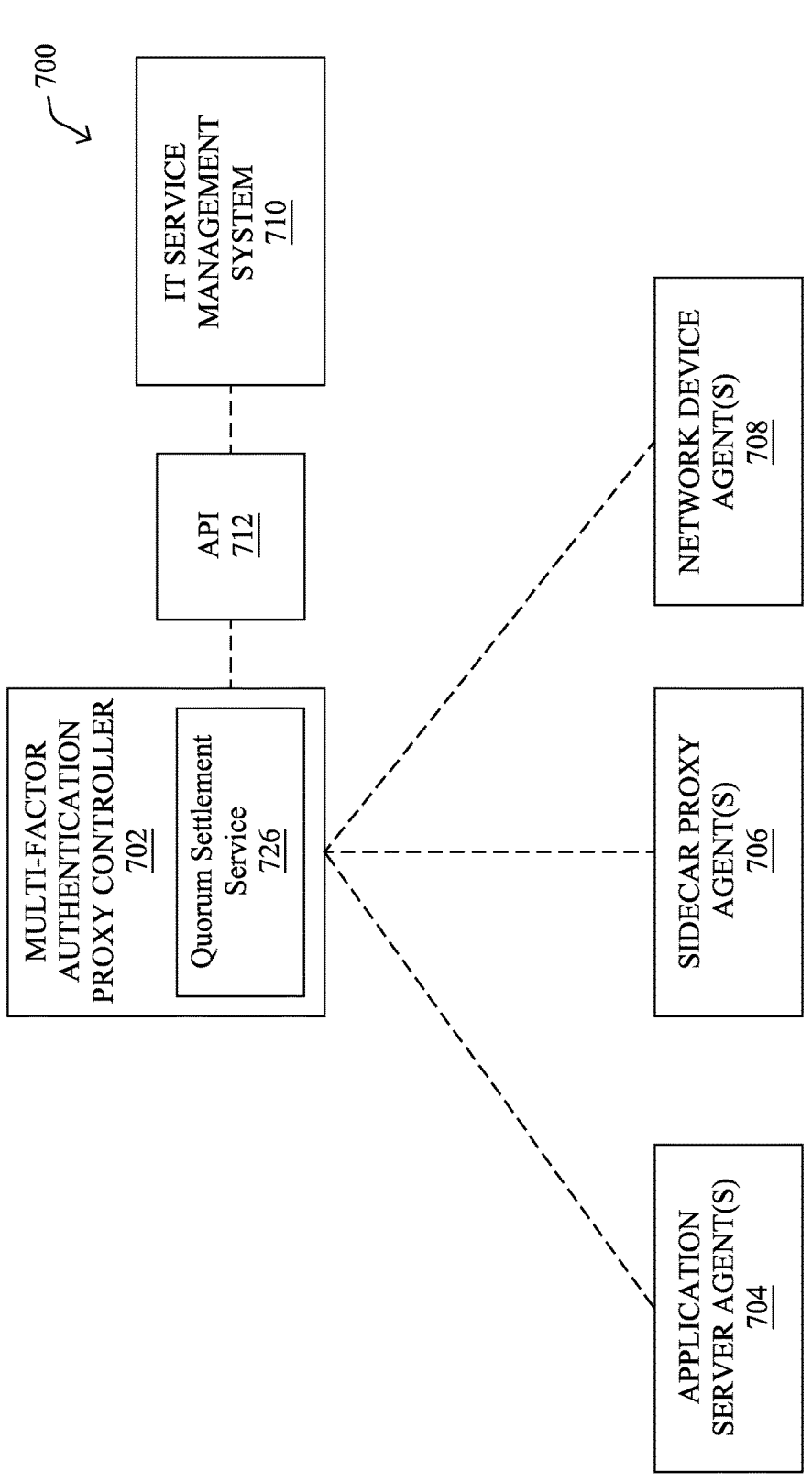

Accordingly, as shown in FIG. 7E, multi-factor authentication proxy controller 702 may be configured to, optionally, make determinations regarding whether a requested action of privileged user 724 is to be approved, based on "votes" of other administrators 720, using enhanced composite quorum settlement service 726. Enhanced composite quorum settlement service 726 provides robust, yet still streamlined approval process. Further, while it is described with respect to determinations of whether a number of administrators have approved an action, the techniques herein are contemplated to be applicable to a broader range of approvals within organizations. Generally, an action is to be analyzed for approval using enhanced composite quorum settlement service 726 may be statically flagged (e.g., by being included in a list as described herein above) may be dynamically flagged based on observed analytics of user behavior.

Accordingly, multi-factor authentication proxy controller 702 may be configured by enhanced composite quorum settlement service 726 to dynamically group one or more of the other administrators 720 to identify a number of them as an approvers group. Of note, additional approvers may be dynamically added to an approver group for more significant, impactful, risky, etc. actions). Generally, these approvers may predominantly be peers of the requester (e.g., privileged user 724), and not necessarily members of requester organizational hierarchy. It is contemplated that hierarchical managers may be involved and invoked as part of the approver group, with variable weightings applied based on the organizational hierarchy.

Members of a given approvers group do not necessarily have an equal vote in the approval process. Rather, their votes are dynamically weighted based on a variety of factors, which may be indicated by an Approver Reputation Score (ARS). ARS is a measure of how "reliable" an approver is, and it may be determined using a number of different methods, operating separately or in combination. For example, if an approver always approves requests within a certain amount of time, like five minutes, of receiving them, this may be identified as indicating a lack of due diligence in evaluating the requests, thereby resulting in a lower ARS. Conversely, an approver could be anonymously rated by other approvers in a group/team, and if noted by those approvers as someone that is diligent and thoughtful, such ratings could result in a higher ARS.

As an example, consider that there are three approvers that have been dynamically grouped together to approve a given action, as follows:
Approver-1 with an ARS of 80/100 (indicating a reliable approver);
Approver-2 with an ARS of 60/100 (indicating a somewhat-reliable approver); and
Approver-3 with an ARS of 30/100 (indicating an unreliable approver).

A combined score that is required, by enhanced composite quorum settlement service 726, to approve a given task may vary. For example, one task might require an approval score of 100 (or higher) to proceed. If, for example, Approvers 2 and 3 approved the action, but Approver 1 did not, the resulting combined score (60+30) would be below this pre-set bar (of 100), and the action would be denied, even though two out of three approvers voted for it. On the other hand, if Approvers 1 and 2 voted for it, the action would be approved, as the combined score (80+60) would exceed the required score. In this specific case, no single vote would be enough to get over the pre-set bar, and as such a quorum for approval is forced. In another example, a combined score for the action to be approved may be set at a lower level (such as 75), so that the action potentially could be approved by a single approval. A requirement may be configured such that the single approver must be identified as a reliable approver, otherwise, a quorum may still be required.

A required quorum may also be adjusted so as to provide flexibility, as in the case of an approval chain that leads to a single individual who may be otherwise occupied and not available to make a rapid decision to approve a request (e.g., a vice president, tech lead, etc.). In such a case, by leveraging a pool of multiple approvers who are at peers of the requester (and as such each of these has a working knowledge of the decision and its potential ramifications), decision making can be expedited without sacrificing the overall quality of the decision making process. Furthermore, to guard against multiple less-reliable approvers colluding to drive an approval into an approved state, a lower bound could be dynamically set (based on the severity or consequences of the action involved), so that the decision would only be directed to approvers with a minimum reputation score (e.g. 40 or higher). In this manner, more serious actions would only be directed to approvers who have demonstrated themselves reliable.

In one or more embodiments, based on a given action involved, a level of approval required may be dynamically derived by enhanced composite quorum settlement service 726. For example, some relatively minor or localized actions (e.g., deleting one or two user accounts, changing a single end-user password, etc.) might receive approval with an ARS score of only 60 (rather than 100), such that in the above example such a minor or localized action could be approved by either approver 1 alone, or approvers 2 and 3 acting in concert. However, for actions that have a wider impact (e.g., deleting many user accounts, changing one or more passwords and/or security credentials on critical systems), an approval score or 120 (or even higher) might be required, meaning that multiple more-trusted approvers would have to act in concert to approve such an action.

As noted above, privileged user abuse may be extraordinarily harmful and costly for an organization. Related to privileged user abuse is data mining, a type of an abusive act that is oftentimes attributable to originating from within an organization. Notably, a recent analysis of information security breaches has found that approximately 23 percent of attacks may be categorized as "internal incidences", where information, data, etc. is leaked from within an organization using user accounts. On top of this, when combined with third-party attacks/incidents, almost half of all information security breaches originate from authorized user accounts. Unsurprisingly then, internal threats, which include data mining and leaking (by employees and third-parties), is a top-of-mind security issue.

Mitigating and/or preventing information security breaches by authorized users and/or user accounts, however, presents numerous challenges, including:

authorized users, due to their role, function, etc. in organizations, are given user accounts as well as access in performing their duties, daily tasks, etc.;

differentiating legitimate and productive access to secure information from harmful and potentially malicious access to secure information (i.e., data mining) is difficult to determine;

correlating logs from various sources conventionally requires significant amounts of time, during which significant data can be mined and leaked if such behavior continues unabated, to yield actionable insights; and implementation of client-side software, as one option to mitigate data mining and exfiltration, is not a solution that every organization is willing and able to mandate and enforce.

Detecting Anomalous Transactions Within an Application by Privileged User Accounts The techniques herein, therefore, introduce detecting anomalous transactions within an application by privileged user accounts. In some aspects, inferences are made regarding monitored activity associated with user accounts of the online application, where the inferences are indicative of data mining and/or exfiltration activities. The inferences may be made without requiring client-side application(s) to be installed, distributed, managed, and enforced alongside the online application. Notably, the user accounts, while typically intended for use by only by authorized users, may be taken advantage of by internal employees, authorized third parties, or even people that have co-opted the user accounts.

That is, a standalone application agent and/or tenant (of a multi-tenant agent) may be leveraged along with machine learning techniques to identify, intercept, and block potential data mining activity associated with user accounts of a given online application (from within the online application's runtime domain). The machine learning techniques generally encompass establishing a baseline behavioral model based on previous transactions of the online application monitored through instrumentation techniques as described herein above. For example, for a particular user account or user accounts generally, expected behavior such as a user account opening a number of records/files/etc. in a short amount of time, viewing a given record/file/etc. for minimum (or maximum) amount of time, etc. may be determined. Subsequent transactions by user accounts of the online application may then be compared to a behavior model, and ones that do not fall within expected behavior are identified as suspicious and/or anomalous. These identified transactions may then be notified, reported, etc. to IT system administrators (who may determine one or more mitigation actions to be taken). Alternatively, one or more enforcement policies may be applied for the identified transactions that mitigate the identified transactions. For example, instrumentation inserted by the application agent/tenant into the online application may be used to block an identified suspicious transaction, without the need of re-engineering application code (of the online application) or having to install client-side software.

Specifically, according to one or more embodiments described herein, a device obtains data regarding a transaction attempted by a user account within an online application that is captured by instrumentation code that is inserted into the online application at runtime, wherein the user account has sufficient privileges within the online application to perform the transaction. The device makes an inference about the data regarding the transaction using a behavioral model. The device determines, based on the inference, a mitigation action for performance within the online application according to an enforcement policy. The device enforces the mitigation action within the online application.

Figure 8:
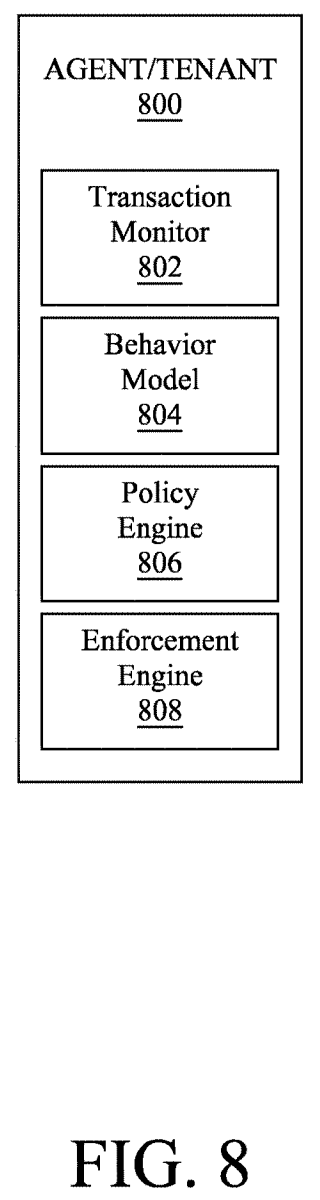

Operationally, with reference to FIG. 8, an example simplified agent/tenant for detecting anomalous transactions within an application by privileged user accounts is shown. Agent/tenant 800 may comprise, perform the functions of, etc. of previously described plurality of tenants 606a-606n and/or plurality of application server agents 704. Agent/tenant 800 may be configured to monitor an application (e.g., java application 602) such as a confidential document system, database, etc. that is generally configured to provide access to records to user accounts (that have varying levels of privileged access to the records) and is at risk of being data mined by users that have access to these user accounts. Further, the application may be running within an enterprise computing environment. Records may comprise confidential documents that may only be accessed by some user accounts, modified by another set of user accounts, etc., as is understood by one having skill in the art. Generally, records are deemed confidential and/or only accessible by particular user accounts (of the online application) by administrators or stakeholders of the online application itself, without having to rely on policing metadata insertion on a record-by-record basis, as is conventionally done. Also, records may comprise a variety of file types and are not bound by or limited to a particular file type (or file types) like .pdf, .docx, etc.

It is contemplated that a user using the application, with particular user account, may typically review records within the application by reading, digesting, evaluating, interacting, making comments, providing feedback, approving/denying, etc. for a given record. Generally, each of these actions/transactions may be tracked, monitored, and reported (in terms of which user account is accessing it, for how long, from where, etc.) using instrumentation techniques of core agent 604, as described herein above.

Agent/tenant 800 comprises transaction monitor component 802, behavioral model component 804, policy engine 806, and enforcement engine 808, which may be implemented for detecting anomalous transactions within an application by privileged user accounts. Transaction monitor component 802 is configured to obtain information indicative of transactions/actions that occur within a given online application at a periodic basis (e.g., one a minute). In particular, such information can generally summarize actions/transactions that occur with respect to records available on a confidential document system, specifically with respect to user accounts (that are given access to these records). For example, core agent 604 may be configured to intercept, summarize, and export transaction details for java application 602 to transaction monitor component 802, where the transaction details may be parsed by user identifier(s)/name(s), transaction identifier(s)/name(s) (e.g., accessing a record, modifying a record, etc.), time taken for a given transaction, etc. Generally, as described herein, it is contemplated that core agent 604 may have the ability to allow or disallow a given transaction to proceed based on instructions that it receives from agent/tenant 800. In one or more embodiments, agent/tenant 800 may receive the information over a data pipeline such as a Cloud Native Kafka solution.

Behavioral model component 804 may, using the transaction details obtained by transaction monitor component 802, be configured to apply one or more machine learning techniques to model, predict, profile, etc. normal and abnormal behavior associated with user accounts of the online application (e.g., confidential document system). This may be done at multiple levels of abstraction, including profiling at:

an application level, defining normal and anomalous behavior for user accounts as a whole;

a role level, defining normal and anomalous behavior for a given subset/grouping of the user accounts (e.g., user accounts denote as reviewers); and an individual user level, defining normal and anomalous behavior for a particular user account of the online application (e.g., userABC).

Results of the machine learning-based profiling done by behavioral model component 804 may be summarized. Example observations that may be derived, at a role level for a given online application, in summary, may include:

95% of the time, reviewer-level user accounts open a maximum of ten records per hour;

15 95% of the time reviewer-level user accounts spend a minimum of five minutes on each individual record;

95% of the time reviewer-level user accounts spend a maximum of 30 minutes on each individual record; and 95% of the time reviewer-level user accounts do not open more than three sequentially-numbered records in a row.

It is contemplated that behavioral model component 804 may comprise an inference engine to derive insights into potentially suspicious abnormal behaviors based on these aforementioned observations. Further, in one or more embodiments, it is contemplated that the MFA or CMFA may be leveraged and implemented so as to provide specific contextual information that can be used in the determination and feeding into the one or more machine learning and/or artificial modules of behavioral model component 804 (e.g., a user's location at accessing, time of day at location, etc.).

Policy engine 806, in combination with behavioral model component 804, may be configured to present an administrator (e.g., of an IT system associated with the online application/confidential document system) one or more insights regarding user account behavior, as previously described. Notably, the administrator may decide when and how policies are to be implemented to mitigate user actions indicative of data-mining. For example, these insights may include identifying behaviors that may be so unusual that they may be potentially seen as suspicious or likely indicating data mining, such as:

it may be determined that it is highly anomalous and potentially suspicious behavior for time reviewer-level user accounts to rapidly open multiple records of an online application in a row, while spending only a few seconds on each (i.e., opening a record for less than five seconds, one after another, is generally understood as being long enough to print/save/copy the information but not long enough to read and digest it); and it may be determined that it highly anomalous and potentially suspicious behavior for time reviewer-level user accounts to open several sequentially-numbered records in a row, for example, record #8001, then #8002, then #8003, then #8004, etc. (i.e., for a given online application it may be rare for a reviewer to sequentially select one record number after the next given how records are distributed among reviewers).

For each of these insights, policy engine 806 may present an administrator with enabling a specific policy (e.g., mitigation action(s)) or dismissing an insight. For example, a given insight may have one or more of the following policies selected, including an alerting policy (to inform key stakeholders of potential suspicious actions), an interception policy (that pauses the requested transaction from completing until appropriate approval is received), a blocking policy that blocks transactions that fall within an insight, etc.

Figure 9:
FIG. 9 illustrate an example insight and associated enforcement policy.
Figure 9:
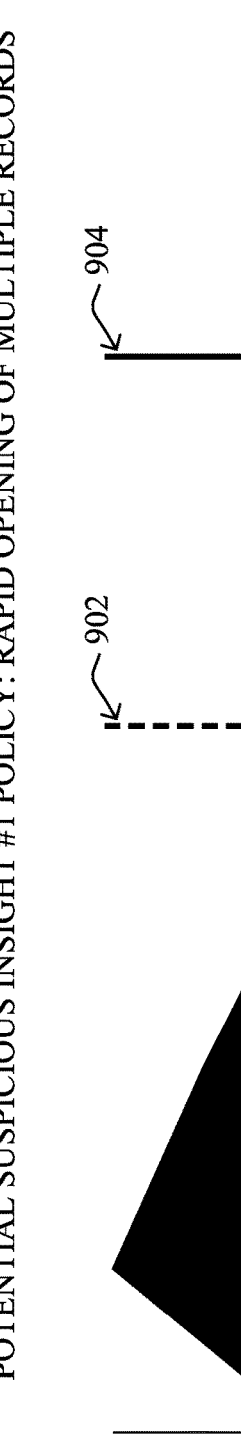
Figure 9:
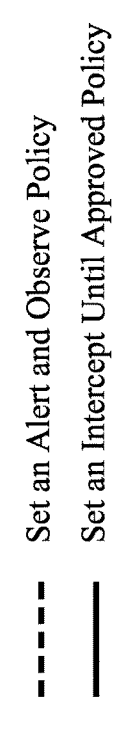

It is contemplated that a given insight may have more than one associated policy implemented for it. That is, an administrator may configure an insight to have more than one threshold, where each threshold is associated with a particular mitigation action. As shown in FIG. 9, an example insight and associated enforcement policy are shown. Notably, chart 900 is indicative of observed occurrences regarding the rapid opening of multiple records for a given online application. For this insight, an administrator may configure a first threshold 902 that causes an alert and observe policy to be implemented for transactions that are indicative of a user account being used to open a threshold number of records for less than ten seconds in a row. A second threshold 904 may additionally be applied that causes an intercept until approved policy to be implemented for transactions that are indicative of a user account being used to open another threshold number of records for less than ten seconds in a row.

Returning to FIG. 8, enforcement engine 808 may, in combination with core agent 604, be configured to implement and enforce policies associated with insights (provided by behavioral model component 804 and policy engine 806). That is, when a policy event threshold is observed to have been reached (e.g., by agent/tenant 800) enforcement engine 808 is configured to implement a given enforcement policy. In the case of alert and observe policy, the policy mitigation action may simply be to send a message or notification to relevant stakeholders (e.g., a direct manager associated with a user account, peers of the user account, etc.), in accordance with the techniques described herein above. Such a notification may be sent by email, SMS, online chat application, any other notification system/application. For example, the notification may comprise a SMS or MMS message indicating "ALERT: username1 has been rapidly opening an anomalous number of records; such actions may be indicative of data-mining. THIS IS AN ALERT ONLY. NO ACTION IS REQUIRED AT THIS TIME."

In the case of intercept until approved policy, the policy mitigation action may be to indefinitely intercept a requested transaction until explicit approval is obtained, also in accordance with the techniques described herein above (e.g., using a quorum settlement policy). Additionally, requests for approval may similarly be sent by the same notification systems and/or applications as the alert and observe policy. For example, the notification may comprise a SMS or MMS message indicating "Rule Violation: username1 has been rapidly opening an excessive number of records; such actions may be indicative of data-mining. Please choose an action to be taken: ALLOW, BLOCK, TEMPORARILY REVOKE."

It is contemplated that additional policy mitigation actions may also be supported. One may be to temporarily remove user account access to an online application (e.g., for a predetermined amount of time, until a proper investigation may be completed, etc.). Alternatively, another one may be effectively "quarantine" a device associated with a user account such that the device may no longer access an online application. Further, it is generally contemplated that in all cases where a policy mitigation action is performed, such events may be exported to user and entity behavior analytics (UEBA) systems, such as Exabeam™ for the purposes if sharing information and/or insights. Event logs may also be exported to security incident response systems, such as Cisco SecureX™ to properly report, investigate, and (when necessary) prosecute incidents.

Figure 10:
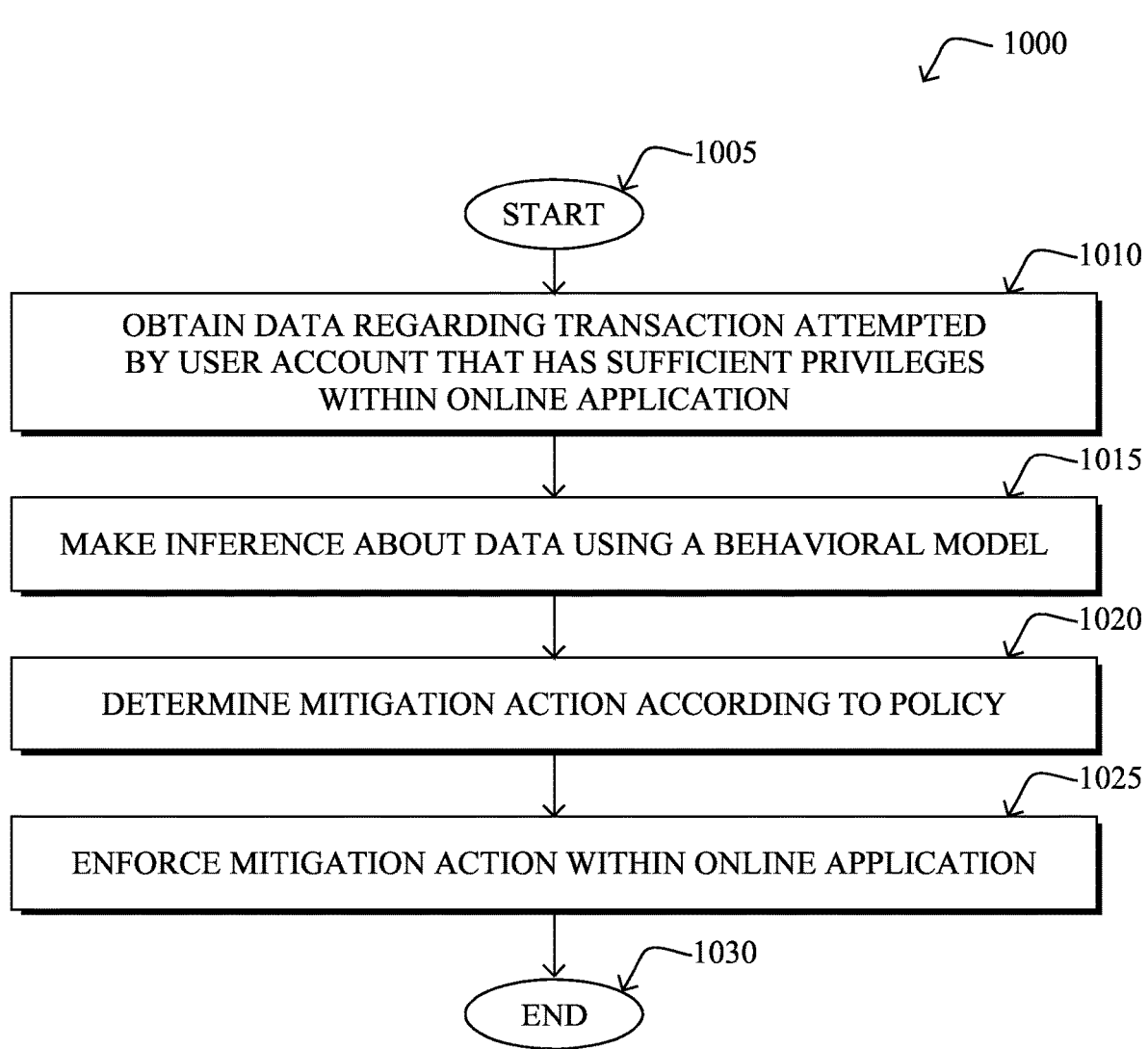
FIG. 10 illustrates an example simplified procedure for detecting anomalous transactions within an application by privileged user accounts, in accordance with one or more embodiments described herein.

In closing, FIG. 10 illustrates an example simplified procedure for detecting anomalous transactions within an application by privileged user accounts, in accordance with one or more embodiments described herein. For example, a non-generic, specifically configured device (e.g., device 200, particularly a monitoring device) may perform procedure 1000 by executing stored instructions (e.g., process 248, such as a monitoring process) that include a multi-tenant agent to instrument a Java application. The procedure 1000 may start at step 1005, and continues to step 1010, where, as described in greater detail above, the device may obtain data regarding a transaction attempted by a user account within an online application that is captured by instrumentation code that is inserted into the online application at runtime, wherein the user account has sufficient privileges within the online application to perform the transaction. In one embodiment, the data regarding the transaction attempted by the user account within the online application may comprise at least one of a user identifier, a username, a transaction identifier, a transaction name, and a time taken for the transaction. In one or more embodiments, the instrumentation code may be inserted by a core agent into the online application.

At step 1015, as detailed above, the device may make an inference about the data regarding the transaction using a behavioral model. In one embodiment, the behavioral model may be generated based on transactions previously monitored by the instrumentation code or contextual information from a continuous multi-factor authentication. In one or more embodiments, making, by the device, the inference about the data regarding the transaction using the behavioral model may be based on a role level associated with the user account. As would be appreciated, the inference may be that the user account is being used rapidly open a plurality of records of the online application in a row while viewing each of the plurality of records less than a predetermined amount of time. In an embodiment, the inference may be that the user account is being used to open a predetermined number of sequentially numbered records of the online application.

At step 1020, the device may determine, based on the inference, a mitigation action for performance within the online application according to an enforcement policy. In one or more embodiments, the mitigation action for performance within the online application according to the enforcement policy may comprise a plurality of thresholds that are each associated with a corresponding mitigation action.

At step 1025, as detailed above, the device may enforce the mitigation action within the online application. In one or more embodiments, the mitigation action for performance within the online application according to the enforcement policy may comprise an alert and observe policy, for example, sending a SMS or MMS message to an administrator of the online application. In an embodiment, the mitigation action for performance within the online application according to the enforcement policy may comprises an intercept the transaction until approved policy, where the transaction may be blocked if not approved.

The procedure 1000 may then end in step 1030, notably with the ability to continue ingesting and processing data. Other steps may also be included generally within procedure 1000.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide detecting anomalous transactions within an application by privileged user accounts. In particular, inferences are made regarding monitored activity associated with user accounts of the online application (e.g., using instrumentation of core agent 604), where the inferences are indicative of data mining and/or exfiltration activities. Potential data mining activity associated with user accounts of a given online application (from within the online application's runtime domain) may then be identified, intercepted, and blocked. By deploying this method, the instrumentation inserted by the application agent/tenant into the online application may also be used to block an identified suspicious transaction, without the need of re-engineering application code (of the online application) or having to install client-side software.

Illustratively, the techniques described herein may be performed by hardware, software, and/or firmware, such as in accordance with the illustrative application monitoring process 248, or another Java agent, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: obtaining, by a device, data regarding a transaction attempted by a user account within an online application that is captured by instrumentation code that is inserted into the online application at runtime, wherein the user account has sufficient privileges within the online application to perform the transaction; making, by the device, an inference about the data regarding the transaction using a behavioral model; determining, by the device and based on the inference, a mitigation action for performance within the online application according to an enforcement policy; and enforcing, by the device, the mitigation action within the online application.

In one embodiment, the data regarding the transaction attempted by the user account within the online application comprises at least one of a user identifier, a username, a transaction identifier, a transaction name, and a time taken for the transaction. In another embodiment, the behavioral model is generated based on transactions previously monitored by the instrumentation code or contextual information from a continuous multi-factor authentication. In a further embodiment, making, by the device, the inference about the data regarding the transaction using the behavioral model is based on a role level associated with the user account. In yet another embodiment, the inference is that the user account is being used rapidly open a plurality of records of the online application in a row while viewing each of the plurality of records less than a predetermined amount of time. In another embodiment, the inference is that the user account is being used to open a predetermined number of sequentially numbered records of the online application. In an additional embodiment, the mitigation action for performance within the online application according to the enforcement policy comprises an alert and observe policy. In a further embodiment, the mitigation action for performance within the online application according to the enforcement policy comprises an intercept the transaction until approved policy. In yet another embodiment, the mitigation action for performance within the online application according to the enforcement policy comprises a plurality of thresholds that are each associated with a corresponding mitigation action. In another embodiment wherein the instrumentation code is inserted by a core agent into the online application.

According to the embodiments herein, a tangible, non-transitory, computer-readable medium herein may have computer-executable instructions stored thereon that, when executed by a processor on a device, may cause the device to perform a method comprising: obtaining, by the device, data regarding a transaction attempted by a user account within an online application that is captured by instrumentation code that is inserted into the online application at runtime, wherein the user account has sufficient privileges within the online application to perform the transaction; making, by the device, an inference about the data regarding the transaction using a behavioral model; determining, by the device and based on the inference, a mitigation action for performance within the online application according to an enforcement policy; and enforcing, by the device, the mitigation action within the online application.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: obtain data regarding a transaction attempted by a user account within an online application that is captured by instrumentation code that is inserted into the online application at runtime, wherein the user account has sufficient privileges within the online application to perform the transaction; make an inference about the data regarding the transaction using a behavioral model; determine, based on the inference, a mitigation action for performance within the online application according to an enforcement policy; and enforce the mitigation action within the online application.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a tenant", "by a server", or "by a controller," those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent", by particular types of agents (e.g., application agents, network agents, etc.), or "by a tenant", the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

obtaining, by a server, data regarding a transaction attempted by a user account within an online application that is captured by instrumentation code that is inserted into the online application at runtime, wherein the user account has sufficient privileges within the online application to perform the transaction, wherein the server comprises a multi-tenant agent and a tenant, and wherein the online application is located on the server;

making, by the multi-tenant agent and the tenant and during runtime, an inference about the data regarding the transaction using a behavioral model that is generated based on transactions previously monitored by the instrumentation code, the inference based on a comparing the transaction to a baseline of transactions previously monitored on one or more of an application level, role level, or user level for detecting anomalous behavior by the transaction, wherein the inference is indicative of both (i) data mining and (ii) exfiltration activities;

determining, by the multi-tenant agent and the tenant and based on the inference, a mitigation action for performance within the online application according to an enforcement policy; and enforcing, by the multi-tenant agent and the tenant, the mitigation action within the online application.

2. The method as in claim 1, wherein the data regarding the transaction attempted by the user account within the online application comprises at least one of a user identifier, a username, a transaction identifier, a transaction name, and a time taken for the transaction.

3. The method as in claim 1, wherein the behavioral model is further generated based on contextual information from a continuous multi-factor authentication.

4. The method as in claim 1, wherein making, by the multi-tenant agent and the tenant, the inference about the data regarding the transaction using the behavioral model is based on a role level associated with the user account.

5. The method as in claim 1, wherein the inference is that the user account is being used rapidly open a plurality of records of the online application in a row while viewing each of the plurality of records less than a predetermined amount of time.

6. The method as in claim 1, wherein the inference is that the user account is being used to open a predetermined number of sequentially numbered records of the online application.

7. The method as in claim 1, wherein the mitigation action for performance within the online application according to the enforcement policy comprises an alert and observe policy.

8. The method as in claim 1, wherein the mitigation action for performance within the online application according to the enforcement policy comprises an intercept the transaction until approved policy.

9. The method as in claim 1, wherein the mitigation action for performance within the online application according to the enforcement policy comprises a plurality of thresholds that are each associated with a corresponding mitigation action.

10. The method as in claim 1, wherein the instrumentation code is inserted by a core agent into the online application.

11. A tangible, non-transitory, computer-readable medium having computer-executable instructions stored thereon that, when executed by a processor on a server, cause the device to perform a method comprising:

obtaining, by the server, data regarding a transaction attempted by a user account within an online application that is captured by instrumentation code that is inserted into the online application at runtime, wherein the user account has sufficient privileges within the online application to perform the transaction, wherein the server comprises a multi-tenant agent and a tenant, and wherein the online application is located on the server;

making, by the multi-tenant agent and the tenant and during runtime, an inference about the data regarding the transaction using a behavioral model that is generated based on transactions previously monitored by the instrumentation code, the inference based on a comparing the transaction to a baseline of transactions previously monitored on one or more of an application level, role level, or user level for detecting anomalous behavior by the transaction, wherein the inference is indicative of both (i) data mining and (ii) exfiltration activities;

determining, by the multi-tenant agent and the tenant and based on the inference, a mitigation action for performance within the online application according to an enforcement policy; and enforcing, by the multi-tenant agent and the tenant, the mitigation action within the online application.

12. The tangible, non-transitory, computer-readable medium as in claim 11, wherein the data regarding the transaction attempted by the user account within the online application comprises at least one of a user identifier, a username, a transaction identifier, a transaction name, and a time taken for the transaction.

13. The tangible, non-transitory, computer-readable medium as in claim 11, wherein the behavioral model is further generated based on contextual information from a continuous multi-factor authentication.

14. The tangible, non-transitory, computer-readable medium as in claim 11, wherein making, by the multi-tenant agent and the tenant, the inference about the data regarding the transaction using the behavioral model is based on a role level associated with the user account.

15. The tangible, non-transitory, computer-readable medium as in claim 11, wherein the inference is that the user account is being used rapidly open a plurality of records of the online application in a row while viewing each of the plurality of records less than a predetermined amount of time.

16. The tangible, non-transitory, computer-readable medium as in claim 11, wherein the inference is that the user account is being used to open a predetermined number of sequentially numbered records of the online application.

17. The tangible, non-transitory, computer-readable medium as in claim 11, wherein the mitigation action for performance within the online application according to the enforcement policy comprises an alert and observe policy.

18. The tangible, non-transitory, computer-readable medium as in claim 11, wherein the mitigation action for performance within the online application according to the enforcement policy comprises an intercept the transaction until approved policy.

19. The tangible, non-transitory, computer-readable medium as in claim 11, wherein the mitigation action for performance within the online application according to the enforcement policy comprises a plurality of thresholds that are each associated with a corresponding mitigation action.

20. A server, comprising:

one or more network interfaces to communicate with a network;

a processor coupled to the one or more network interfaces and configured to execute one or more processes; and a memory configured to store a process that is executable by the processor, the process, when executed, configured to:

obtain data regarding a transaction attempted by a user account within an online application that is captured by instrumentation code that is inserted into the online application at runtime, wherein the user account has sufficient privileges within the online application to perform the transaction, wherein the server comprises a multi-tenant agent and a tenant, and wherein the online application is located on the server;

make, by the multi-tenant agent and the tenant and during runtime, an inference about the data regarding the transaction using a behavioral model that is generated based on transactions previously monitored by the instrumentation code, the inference based on a comparing the transaction to a baseline of transactions previously monitored on one or more of an application level, role level, or user level for detecting anomalous behavior by the transaction, wherein the inference is indicative of both (i) data mining and (ii) exfiltration activities;

determine, by the multi-tenant agent and the tenant and based on the inference, a mitigation action for performance within the online application according to an enforcement policy; and enforce, by the multi-tenant agent and the tenant, the mitigation action within the online application.

* * * * *